(12) United States Patent
Lawhon et al.

(10) Patent No.: US 12,071,802 B2
(45) Date of Patent: Aug. 27, 2024

(54) DOOR SYSTEM WITH IMPROVED INSTALLATION, SET-UP, AND CLONING

(71) Applicant: ASSA ABLOY Accessories and Door Controls Group, Inc., Monroe, NC (US)

(72) Inventors: Dustin Lawhon, Lilesville, NC (US);
Brian D. Hass, Monroe, NC (US);
David M. Price, Weddington, NC (US);
Lana Kirkpatrick, Monroe, NC (US);
Kelli A. Harper, Stallings, NC (US);
Henry B. Wallace, Fincastle, VA (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 0 days.

(21) Appl. No.: 18/093,192

(22) Filed: Jan. 4, 2023

(65) Prior Publication Data

US 2023/0146416 A1 May 11, 2023

Related U.S. Application Data

(63) Continuation of application No. 16/818,462, filed on Mar. 13, 2020, now Pat. No. 11,549,302.

(Continued)

(51) Int. Cl.
*E05F 15/70* (2015.01)
*E05F 15/77* (2015.01)
*G05B 19/042* (2006.01)

(52) U.S. Cl.
CPC .............. *E05F 15/70* (2015.01); *E05F 15/77* (2015.01); *G05B 19/0426* (2013.01);
(Continued)

(58) Field of Classification Search
CPC ......... E05F 15/70; E05F 15/77; E05F 15/603; E05F 15/63; G05B 19/0426;
(Continued)

(56) References Cited

U.S. PATENT DOCUMENTS 4,108,090 A * 8/1978 Landau, Jr. .......... G05B 19/102
                                                  318/568.1
5,969,637 A    10/1999 Doppelt et al.
(Continued)

FOREIGN PATENT DOCUMENTS

CN    108518149 A    9/2018
CN    108825035 A    11/2018
(Continued)

OTHER PUBLICATIONS

Assa Abloy Accessories and Door Controls Group, Inc., International Application No. PCT/US2020/022720, International Search Report and Written Opinion, Jul. 10, 2020.
(Continued)

*Primary Examiner* — David Luo
(74) *Attorney, Agent, or Firm* — Moore & Van Allen PLLC; Jeffrey R. Gray

(57) ABSTRACT

A door system includes a controller for controlling the door system. A user computer system transmits information to the controller over a wireless connection to modify operating parameters for controlling the operation of the door system. During installation of the door system sensors may be utilized to determine if the door system has been installed properly. The sensors may be used to identify if the door system is mounted level and plum, and to review the movement, vibration, speed, acceleration, force, or the like of the sensors, and thus, the components to which the sensors are operatively coupled in order to make adjustments to the door assembly. Furthermore, the operating
(Continued)

parameters of the installed door system, may be cloned and provided to other door systems in order to quickly clone and distribute the operating parameters of one or more door systems to one or more other door systems.

18 Claims, 11 Drawing Sheets

Related U.S. Application Data

(60) Provisional application No. 62/971,499, filed on Feb. 7, 2020, provisional application No. 62/894,331, filed on Aug. 30, 2019, provisional application No. 62/818,242, filed on Mar. 14, 2019.

(52) U.S. Cl.
CPC .................. *E05Y 2900/132* (2013.01); *G05B 2219/25112* (2013.01); *G05B 2219/2628* (2013.01)

(58) Field of Classification Search
CPC .. G05B 2219/25112; G05B 2219/2628; E05Y 2900/132; E05Y 2400/31; E05Y 2400/36; E05Y 2400/41; E05Y 2400/44; E05Y 2400/456; E05Y 2800/21; E05Y 2800/409; E05Y 2800/422
USPC .............................................. 318/3; 700/275
See application file for complete search history.

(56) References Cited

U.S. PATENT DOCUMENTS

| | | | |
|---|---|---|---|
| 6,316,892 B1 | 11/2001 | Valencia | |
| 7,021,597 B2 | 4/2006 | Vogt | |
| 7,816,879 B2 | 10/2010 | Taheri et al. | |
| 7,839,109 B2 | 11/2010 | Carmen, Jr. et al. | |
| 8,390,219 B2 | 3/2013 | Houser | |
| 8,407,937 B2 | 4/2013 | Houser | |
| 8,499,495 B2 | 8/2013 | Houser et al. | |
| 8,884,760 B2 | 11/2014 | Zenisek et al. | |
| 9,514,583 B2 | 12/2016 | Zasowski et al. | |
| 9,822,553 B1 | 11/2017 | Ho et al. | |
| 9,978,265 B2 * | 5/2018 | McNabb | G08C 17/02 |
| 10,087,673 B1 * | 10/2018 | Rosenmarkle | E05F 15/60 |
| 10,903,765 B2 * | 1/2021 | Knight | H02P 6/08 |
| 2009/0146777 A1 | 6/2009 | Fitzgibbon et al. | |
| 2011/0016971 A1 | 1/2011 | Yulkowski et al. | |
| 2012/0159852 A1 | 6/2012 | Houser et al. | |
| 2014/0325911 A1 | 11/2014 | Hass | |
| 2015/0228134 A1 | 8/2015 | Tehranchi et al. | |
| 2015/0262438 A1 | 9/2015 | Zasowski et al. | |
| 2016/0010379 A1 | 1/2016 | Sauerwein et al. | |
| 2016/0284142 A1 | 9/2016 | Elbling et al. | |
| 2017/0193724 A1 | 7/2017 | Johnson et al. | |
| 2017/0221289 A1 | 8/2017 | Trani | |
| 2018/0072535 A1 | 3/2018 | Hiltunen et al. | |
| 2019/0003236 A1 | 1/2019 | Hall et al. | |
| 2019/0024438 A1 | 1/2019 | Budd et al. | |
| 2019/0147676 A1 | 5/2019 | Madzhunkov et al. | |
| 2019/0188936 A1 | 6/2019 | Sivill et al. | |
| 2019/0249481 A1 | 8/2019 | Cate et al. | |
| 2019/0252814 A1 | 8/2019 | Richardson et al. | |
| 2019/0292835 A1 | 9/2019 | Soderqvist | |
| 2020/0087115 A1 | 3/2020 | Dhumal et al. | |
| 2021/0005036 A1 | 1/2021 | Johnson et al. | |

FOREIGN PATENT DOCUMENTS

| | | |
|---|---|---|
| JP | 2008202275 A | 9/2008 |
| WO | 2016150951 A1 | 9/2016 |
| WO | 2018057591 A2 | 3/2018 |
| WO | 2018104258 A1 | 6/2018 |
| WO | 2020186201 A1 | 9/2020 |

OTHER PUBLICATIONS

Assa Abloy Accessories and Door Controls Group, Inc., International Patent Application No. PCT/US2020/022720, International Preliminary Report on Patentability, Sep. 23, 2021.

Assa Abloy Accessories and Door Controls Group, Inc., European Patent Application No. 20720150.0, Communication pursuant to Article 94(3) EPC, Dec. 8, 2023.

Assa Abloy Accessories and Door Controls Group, Inc., Canadian Patent Application No. 3,131,943, Office Action, Oct. 20, 2023.

* cited by examiner

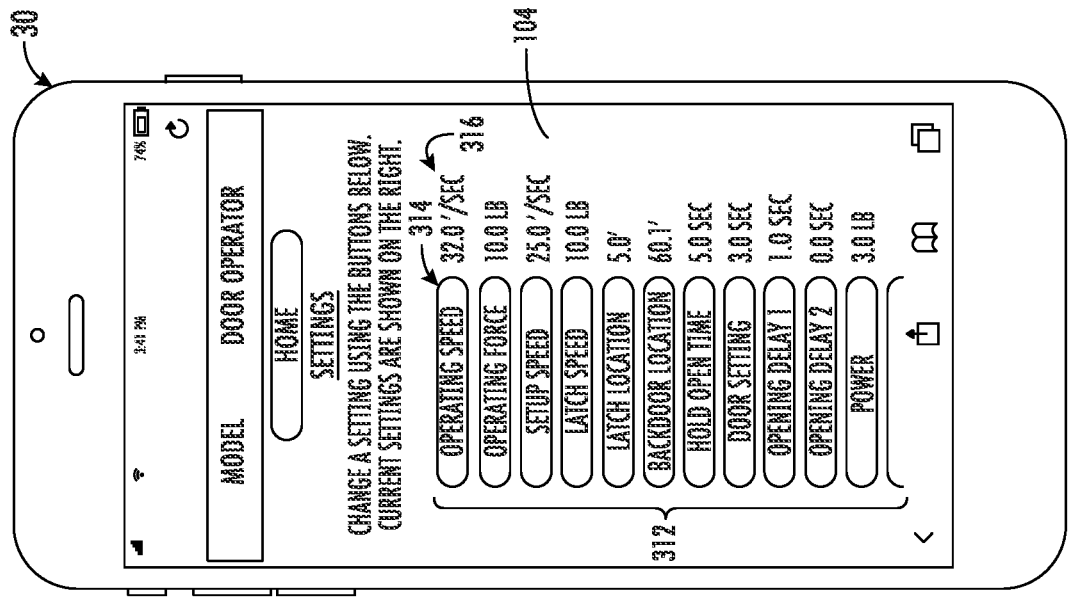

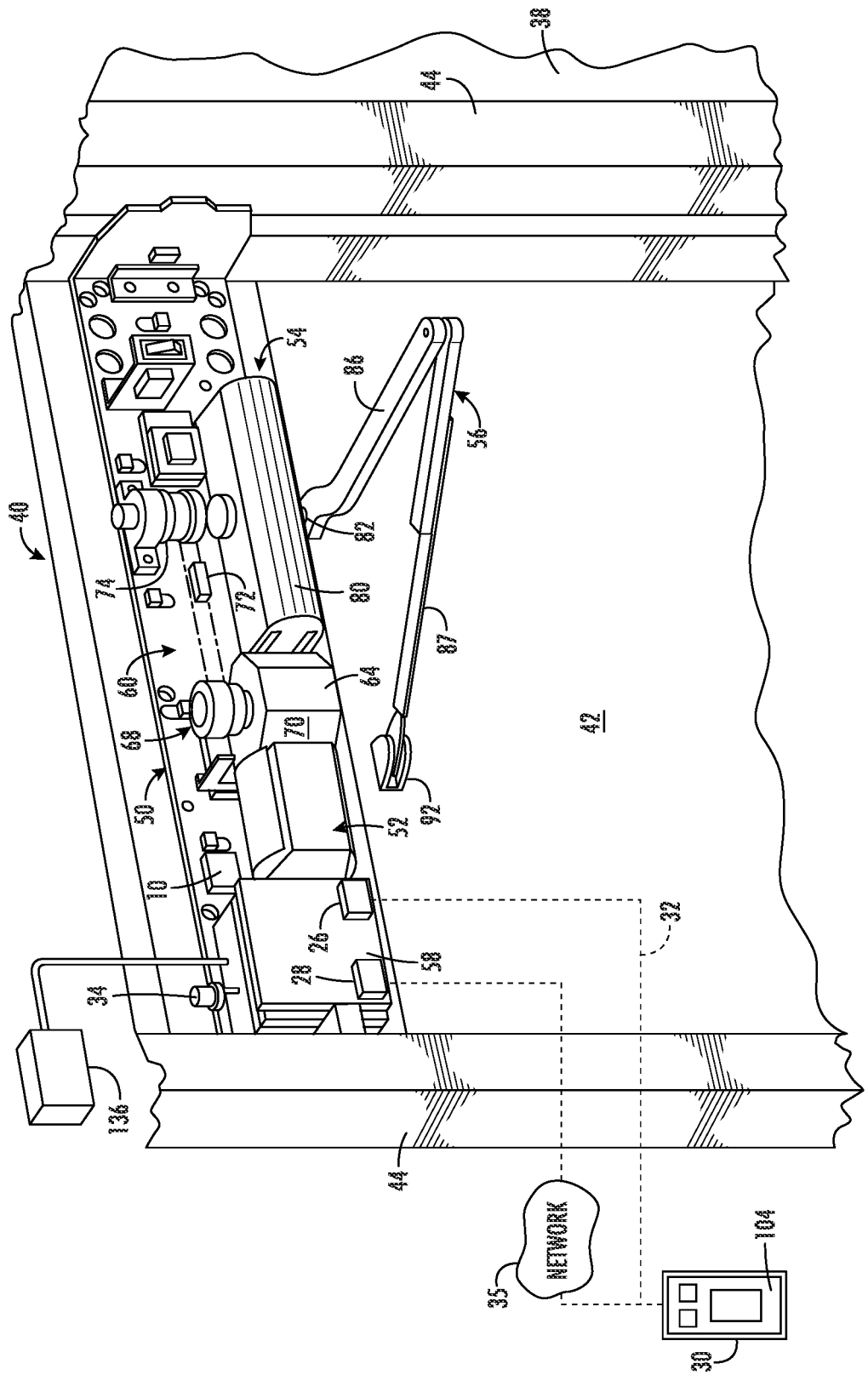

DOOR SYSTEM WITH IMPROVED INSTALLATION, SET-UP, AND CLONING

CROSS REFERENCE AND PRIORITY CLAIM UNDER 35 U.S.C. § 119

The present Application for a Patent is a continuation of claims priority to co-pending U.S. patent application Ser. No. 16/818,462 entitled "Door System with Improved Installation, Set-up, and Cloning", filed on Mar. 13, 2020, which issued into U.S. Pat. No. 11,549,302 on Jan. 10, 2023, which claims priority to U.S. Provisional Patent application Ser. No. 62/818,242 entitled "Door Operator with a Smart Setup System," filed on Mar. 14, 2019; U.S. Provisional Patent application Ser. No. 62/894,331 entitled "Door System with Smart Installation," filed on Aug. 30, 2019; and U.S. Provisional Patent application Ser. No. 62/971,499 entitled "Door System with Operation Cloning," filed on Feb. 7, 2020, all of which are assigned to the assignee hereof and hereby expressly incorporated by reference herein.

FIELD

The present invention relates to door system installation, set-up, and cloning for multisystem installation, and more particularly, to utilizing one or more sensors to determine proper installation of the door system, utilizing wired or wireless communication to set up the operating parameters and/or to clone the operating parameters for multiple door systems, and notifying a user of sensor data related to the installation or operation of the door system.

BACKGROUND

Door systems may include door operators, door closers, or other like systems that control or aids in the operation of opening and/or closing a door. A door operator is a device that is able to open and/or close a door or other barrier, or that aids in opening and/or closing a door or other barrier. Door operators typically include a motor that is connected to a door via a linkage to control motion of the door. Door operators come in a variety of styles and configurations. Alternatively, door closers may only be used to close a door or aid in closing a door. Door closers may have may also have motors, springs, or other features for closing a door. In existing door systems, the doors are installed, the operating parameters are set in order to meet operating requirements set by governmental authorities, standards bodies, entities that purchased the door systems, or the like. While the operating parameters may be set by the installer after installation, it is difficult for installers to determine that the door system is meeting the installation and/or operating requirements.

SUMMARY

In some embodiments a door system comprises a controller for controlling at least one operating parameter of the door system. A user computer system (e.g., a mobile device, such as a smartphone, remote control, and/or the like) may communicate with the controller over a wireless interface directly or indirectly. Alternatively, or additionally, a user may communicate with the controller through inputs and/or output devices on the door system. A drive system, including a motor assembly, drive train, and/or other components, is controlled by the controller where the drive system operates under the at least one operating parameter. The door systems may be door operators, door closers, or other like systems for controlling the operation of a door. As such, it should be understood that when describing features or functions related to a door operator, the same or similar features or functions may relate to a door closer or other systems that control the operation of a door. Consequently, when discussing a door operator, the phrase door operator may be substituted with door closer, which may operate in the same or similar way.

The controller of the door system may comprise a processor for operating the controller and communicating with other components of the controller and/or door system. The controller may also comprise a memory for storing instructions and data, such as the instructions and data for operating the door system. The controller may further comprise a communication interface for allowing communication with the controller and/or between the components of the controller and/or the door system. The communication interface may be a wireless communication interface that may use at least one of WiFi, Bluetooth, BLE, z-wave, Zigbee, 2G, 3G, 4G, 5G, LTE, WPAN, WirelessHD, WiGig, NFC protocols, and/or any other protocols, including any custom protocol. The controller may receive an authentication code or employ an authentication mechanism for allowing access to and/or changing the operation of the door system. The wireless communication interface may operate over short or long range, and such ranges may be adjustable to limit access to the door systems. The wireless communication interface may be on at all times, or it may require an action with respect to an input of the controller, such as activation using a physical input (e.g., key, button, touchscreen, or other like selection) to enable wireless capability of the controller. The controller may act as a server with user interfaces (e.g. web pages, application interfaces, or the like) accessible over the wireless communication interface. The user interfaces can be used for setup, diagnostics, input and output programming, settings, etc. The controller may collect data for tracking, mapping, sensors, communication with other devices, alerts/notifications of door activity, performance, maintenance, faulty accessories, installation, or the like. The wireless interface and/or the control of the door systems may allow for the transfer of operating parameters of one door system to another door system directly between door systems and/or through the use of user computer systems. The wireless communication interface may be used to communicate with other systems for various features/functions such as vestibule, door interlock systems, HVAC control, door synchronization, or the like. The wireless communication interface may be used to communicate with other devices such as locks, exit devices, wall plates, sensors, access control/security systems, or the like. The door systems may comprise one or more inputs devices (e.g., toggle switches, touch screen, ports, or the like) for providing control features (e.g., on/off switches, entering characters, other parameters, or the like). The inputs devices (e.g., switches, or the like) can be used for standard functionality and/or turning wireless capability on and off. The door systems may further comprise sensors (e.g., accelerometers, force detectors, strain detectors, or the like) for additional data collection. For example, an accelerometer may detect an orientation of the door system where the accelerometer communicates with the controller or a force detection sensor that detects the force required to close or open a door where the force detection sensor communicates with the controller.

In some embodiments a door set up system (e.g., door operator set up system, door closer set up system, or the like) comprises a controller for controlling at least one operating parameter (e.g., for opening, closing, setting up, and/or trouble shooting) of the door system. A wireless interface may allow for communication (e.g., directly or indirectly) between the controller and a user computer system over an air interface. A drive system may be controlled by the controller where the drive system operates under the at least one operating parameter. A user computer system may communicate with the wireless communication interface through a wireless connection over a network.

The user computer system may communicate with the controller using at least one of a WiFi, Bluetooth, BLE, z-wave, Zigbee, 2G, 3G, 4G, 5G, LTE, WPAN, WirelessHD, WiGig, NFC protocols, and/or any other protocols, including any custom protocol. The drive system may comprise a motor assembly, including a motor, controlled by the at least one operating parameter.

In some embodiments a method of operating a door system comprises utilizing a controller and/or a user computer system to operate a drive system based on one or more operating parameters. The method may comprise establishing a wireless connection, directly or indirectly, between the controller and the user computer system; receiving at least one operating parameter of the door system at the controller over the wireless connection; saving the at least one operating parameter; and controlling the drive system using the at least one operating parameter. The method may comprise receiving an action through an input device at the controller before establishing the wireless connection. The method may further comprise utilizing an authentication mechanism at the controller before establishing the wireless connection. The wireless communication interface may operate over short or long range, which may be set and/or established by a user. The door system may further comprise receiving a signal at the controller from a sensor that senses an installation condition of the door operator.

During installation of the door system one or more sensors may be utilized in order to determine if the door system has been installed properly and meets any installation requirements (e.g., orientation requirements, operating requirements, or the like) set by any entity, as will be described herein in further detail. The door system may be operatively coupled to one or more sensors (e.g., sensors that may be used for orientation, operation, or the like, such as accelerometers, force sensors, or the like). As such, the one or more sensors may be located within the door system or located outside of the door system, and moreover, may or may not be removable (e.g., may be permanently coupled with the door system or may be removable from the door system). Consequently, the one or more sensors may remain a part of the door system or may be removed after installation and testing.

The one or more sensors may be used to identify if the door system is mounted level (e.g., with respect to a horizontal and/or vertical orientation) and/or plum (e.g., parallel) with respect to the door, the door frame, the wall, or the like. Moreover, the one or more sensors may be utilized to determine if the door system accelerates the door open and/or closed in accordance with the desired operating parameters. Furthermore, the one or more sensors may be utilized to determine if the door system was properly installed based on the vibration of the door system and/or components thereof as the door system operates to open and/or close the door. Additionally, the door system may be utilized in order to determine the force required to open and/or the close the door in order to determine if the door system, door, door frame, hinges, thresholds, or the like were properly installed and/or if any of the forgoing or components thereof are increasing the force required to open and/or close the door in a way that is outside of the installation requirements. It should be further understood that the one or more sensors may also be utilized to identify any installation issues (e.g., in the door system, or other components of the door assembly) and correct such issues by removing components (e.g., thresholds, hinges, or the like), disengaging components (e.g., linkages, or the like), and/or adjusting components (e.g., aligning hinges, linkages, or the like) and retesting the door operation using the one or more sensors in order to meet the installation requirements.

During installation of a door system, or at any point thereafter, the operating parameters of the installed door system, may be cloned and provided to other door systems. As will be described in further detail herein, operating parameters from one or more primary door systems (e.g., a single door system or multiple door systems) may be accessed and cloned (e.g., copied, or the like) in order to quickly and effectively set up secondary door systems (e.g., a single secondary door system or multiple secondary door systems). It should be understood that as used herein with respect to the door systems, "primary" and "secondary" means different door systems, such that the operating parameters of at least one door system are being cloned for use with at least one other door system (e.g., any door system may be a primary and/or secondary door system depending on the door system from which the operating parameters are being cloned and the door system to which the operating parameters are being provided). As such, instead of a user accessing each door system and programing the operating parameters of each door system individually (e.g., an installer during installation, a service provider adjusting and/or performing maintenance with respect to the door systems, or the like), the user may be able to quickly clone and distribute the operating parameters of one or more door systems to one or more other door systems. As will be further described herein, the operating parameters of the door systems may be cloned and provided through the door systems communicating directly with each other, through one or more user computer systems acting as an intermediary (e.g., a mobile device, such as a smart phone, or the like), and/or through a centralized computer system, or the like. The cloned operating parameters may be actual operating parameters for a physical door system that is being installed and/or in current operation. However, in some embodiments, the cloned operating parameters may be from a virtual door system that is not a specific physical door system, but a representation of one or more door systems. As such, an application may store multiple pre-defined door operating configurations (e.g., configurations for physical door systems and/or virtual door systems) which may be provided to (e.g., pushed to, pulled by, or the like) secondary door systems to quickly and easily set up door systems. Alternatively, the cloned operating parameters may be useful in providing customized door system operating parameters that are not already pre-defined to other door systems.

One embodiment of the invention is a door system comprising a controller. The controller comprises one or more processors, one or more memories having computer readable instructions stored thereon, and/or one or more communication interfaces. The controller operates the door system.

In further accord with embodiments of the invention, the one or more communication interfaces are configured to receive information for one or more operating parameters in order to operate the door system.

In other embodiments of the invention, the one or more communication interfaces establish a wireless connection with a user computer system over a network, and wherein the communication interface receives the information for the one or more operating parameters from the user computer system.

In still other embodiments, the invention further comprises one or more inputs devices. The one or more input devices receive an action from a user to activate the one or more communication interfaces before the one or more communication interfaces allow the wireless connection.

In yet other embodiments, the one or more communication interfaces receive an action from the user computer system to establish the wireless connection, wherein the wireless connection is established when the user computer system is authenticated based on the action.

In further accord with embodiments of the invention, the controller further comprises one or more output devices. The one or more output devices provide one or more user interfaces for displaying the information for the one or more operating parameter.

In other embodiments, the invention further comprises a drive system controlled by the controller that operates under the one or more operating parameters.

In still other embodiments, the invention further comprises one or more sensors. The one or more sensors are configured to aid in installation of the door system, and the one or more communication interfaces provide a notification regarding the operation of the door system.

In yet other embodiments of the invention, the one or more sensors comprise at least one orientation sensor. The controller determines a door system orientation based on the orientation sensor, and the notification relates to the door system orientation.

In further accord with embodiments of the invention, the one or more sensors comprise at least one operation sensor. The controller accelerates the door to an open position or a closed position and determines an acceleration or speed of the door using the operation sensor. The controller compares the acceleration or speed of the door to a target acceleration or a target speed and the notification relates to the comparison of the acceleration or the speed of the door to the target acceleration or the target speed.

In other embodiments of the invention, the one or more sensors comprise at least one operation sensor. The controller operates the door to an open position or a closed position, and the controller determines vibration of the door system during operation based on the operation sensor. The controller compares the vibration of the door system to a target vibration and the notification relates to the comparison of the vibration of the door to the target vibration.

In yet other embodiments of the invention, the one or more sensors comprise at least one force sensor. The controller operates the door to an open position or a closed position, and determines a force to operate the door when the door system is activated based on the force sensor. The notification relates to the force determined by the force sensor.

In still other embodiments of the invention, the controller receives a selection of one or more operating parameters stored for the door system and creates one or more cloned operating parameters. The controller further provides the one or more cloned operating parameters to one or more secondary door systems.

In further accord with embodiments of the invention, the controller is operatively coupled to the one or more secondary door systems directly through a wireless connection.

In other embodiments of the invention, the controller is operatively coupled to the one or more secondary door systems indirectly through a wireless connection with a user computer system.

In yet other embodiments of the invention, the controller is operatively coupled to the one or more secondary door systems indirectly through a hardwired connection with a user computer system.

In still other embodiments of the invention, providing the one or more cloned operating parameters comprises storing the one or more cloned operating parameters on a user computer system using a wired connection for later transfer to the one or more secondary door systems.

In other embodiments of the invention, providing the one or more cloned operating parameters to the one or more secondary door systems comprises pushing the one or more cloned operating parameters to the one or more secondary door systems, or the one or more secondary door systems pulling the one or more cloned operating parameters from the controller.

Embodiments of the invention further comprise a method for controlling a door system through the use of a controller. The controller comprises one or more processors, one or more memories having computer readable code stored thereon, and one or more communication interfaces. The controller operates the door system.

Embodiments of the invention further comprise a computer program product for operating a door system. The computer program product comprises at least one non-transitory computer-readable medium having computer-readable program code portions embodied therein, the computer-readable program code portions comprise an executable portion configured to control a door system through the use of a controller.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate embodiments of the invention and which are not necessarily drawn to scale, wherein:

FIGS. 6A-6E are screen shots used in the implementation of the setup system, in accordance with some embodiments of the disclosure.

FIG. 7 is a door operator embodying the setup system, in accordance with some embodiments of the disclosure.

DETAILED DESCRIPTION

Figure 1:
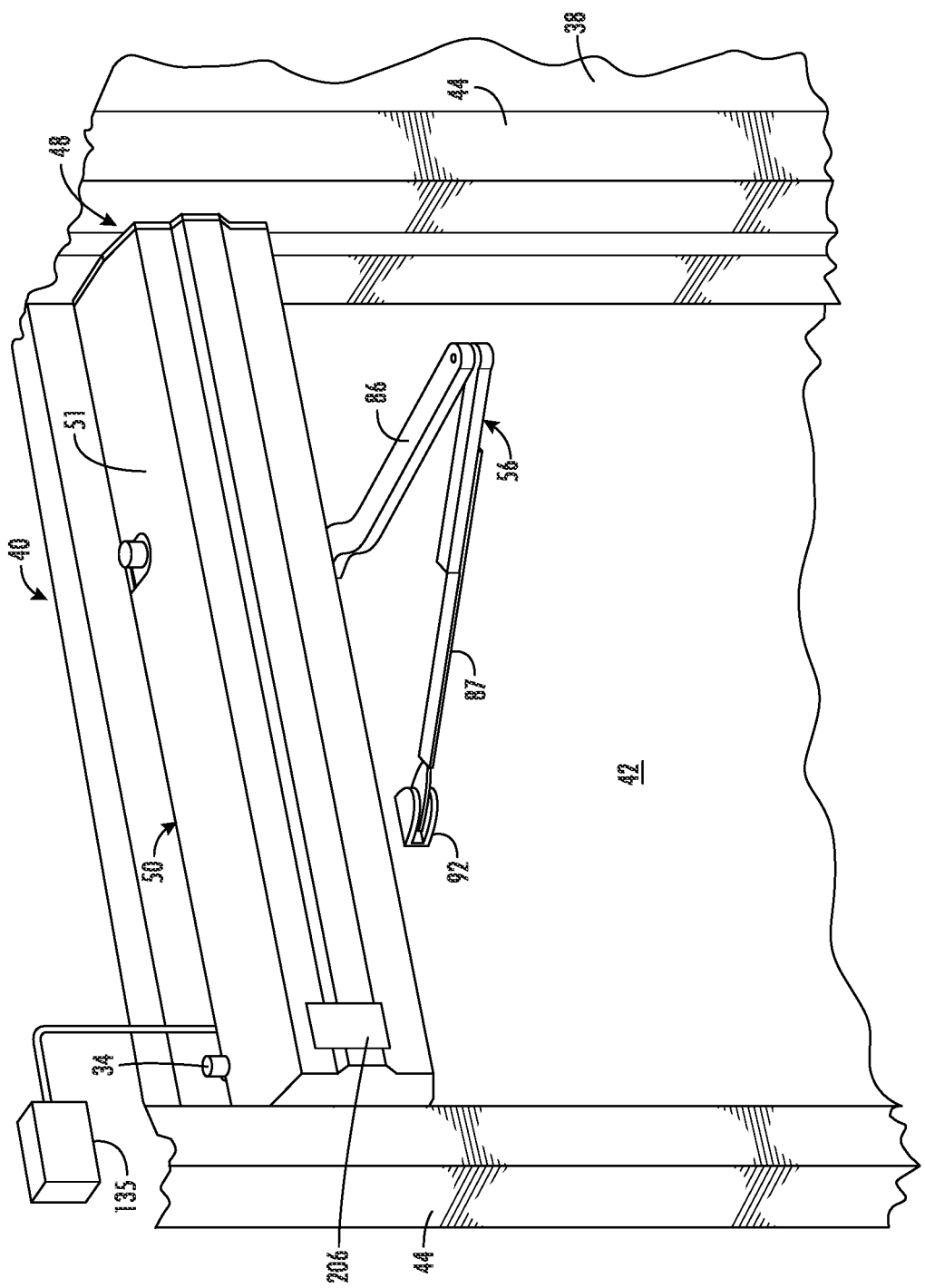
FIG. 1 is a perspective view of a door operator embodying the setup system, in accordance with some embodiments of the disclosure.

The following detailed description teaches specific example embodiments of the invention. Other embodiments do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "upper," "lower," "left," "right," "horizontal," "vertical," "upward," and "downward" merely describe the configuration shown in the figures. The referenced components may be oriented in an orientation other than that shown in the figures and the terminology, therefore, should be understood as encompassing such variations unless specified otherwise. It will be understood that when an element is referred to as being "connected," "coupled," or "operatively coupled" to another element, the elements can be formed integrally with each other, or may be formed separately and put together. Furthermore, "connected," "coupled," or "operatively coupled" to can mean the element is directly connected, coupled, or operatively coupled to the other element, or intervening elements may be present between the elements. When two elements are connected, coupled, or operatively coupled to one another without intervening elements, the elements are referred to as directly connected, directly coupled, or directly operatively coupled. Furthermore, "connected," "coupled," or operatively coupled" may mean that the elements are detachable from each other, or that they are permanently coupled together.

It is understood that a door system (e.g., door operator, door closer, or the like) as described herein can be any system that controls (e.g., moves or aids in moving) a door or other barrier to an entry, an exit, a window or the like. The door system may control a barrier that, for example, swings, slides, or rolls between the open and closed positions. For convenience only, the barrier will be referred to herein as a door and the device will be referred to as a door system (e.g., door operator, door closer, or the like); however, the invention applies to, and can be used with, other types of barriers and the use of the terms "door" and "door system", including the use of "door operator" and "door closer" are not meant to be limiting.

As used herein, the term "open position" for a door or other barrier means a door position other than a closed position, including any position between the closed position and a fully open position (e.g., one or more "open positions"). The term "closed position" for a door or other barrier means a position in which the door or other barrier is completely shut and may be the position where the door or other barrier engages a frame and a lock or latch may be engaged.

Figure 2:
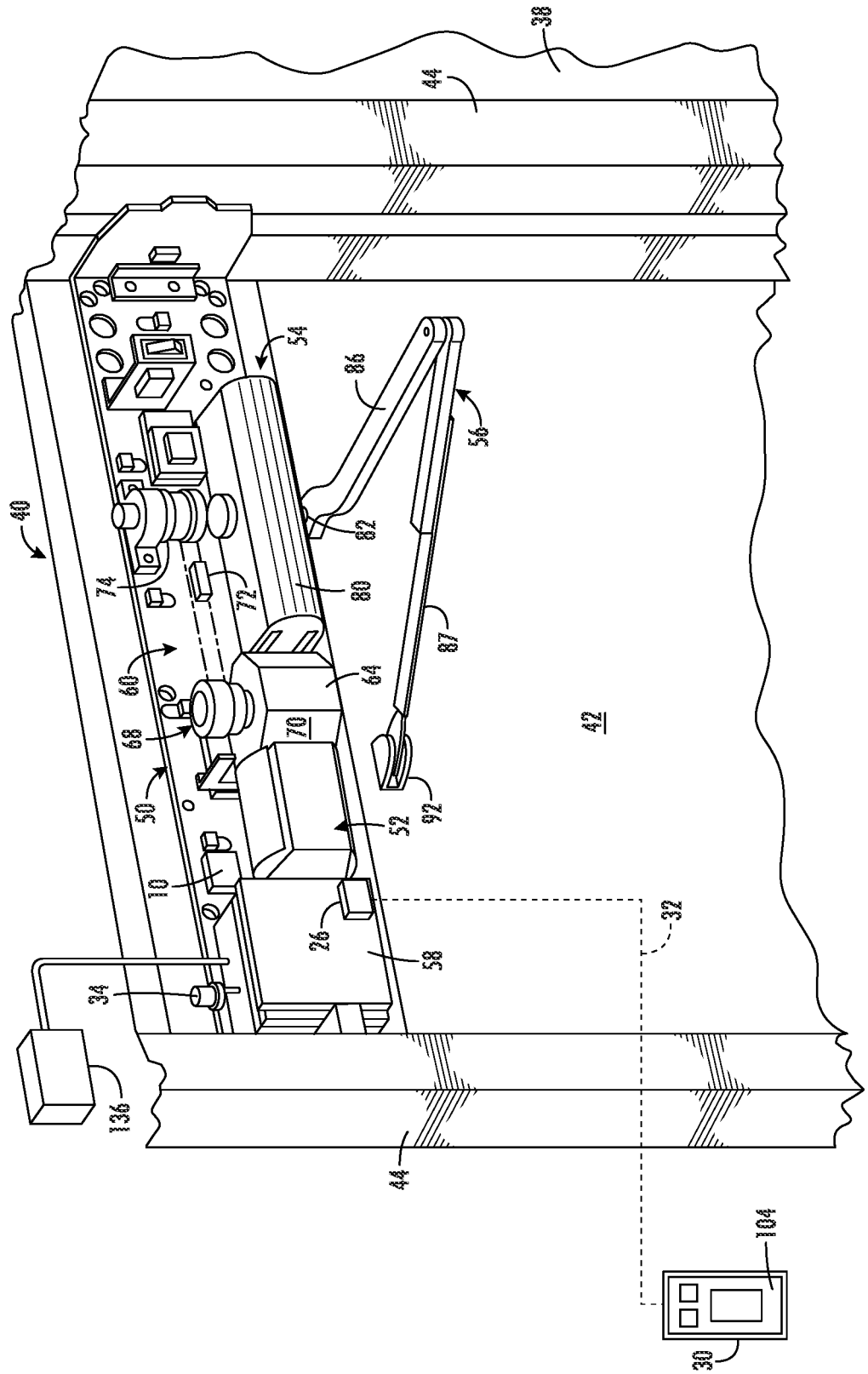
FIG. 2 is a perspective view of the door operator of FIG. 1 with the cover removed.

Referring now to the figures, wherein like reference numerals designate corresponding or similar elements throughout the several views, embodiments of a door system (e.g., illustrated as a door operator) in which the setup system (e.g., a smart setup system) and methods are used is shown in FIGS. 1 and 2 and is generally designated at 40. The door system 40 is mounted adjacent to, and is operatively connected to, a door 42 in a door frame 44. The door 42 moves relative to the frame 44 between a closed position and one or more open positions. For the purpose of this description, only the upper portion of the door 42 and the door frame 44 are shown. The illustrated door 42 is of a conventional type and is pivotally mounted to the frame 44 at hinges for swinging movement between the closed position and one or more open positions.

The door system 40 may comprise a casing 48, otherwise described as a housing, that includes a back plate 50 and a cover 51. A drive system 52 (e.g., comprising a drive train 60 and a motor assembly 62), a closer assembly 54, and/or a controller 58 are mounted in the casing 48 (or at least partially within the casing 48). A linkage assembly 56 operably couples the door system 40 to the door 42. The casing 48 is shown mounted to the door frame 44, however, in other embodiments the casing 48 may be mounted to the door 42, and the linkage assembly 56 operably couples the door system 40 to the door frame 44. The casing 48 is typically mounted in a particular orientation, such as horizontally, with respect to the door frame 44. The cover 51 attaches to the back plate 50 and surrounds and encloses the components of the door system 40 to reduce dirt and dust contamination, and to provide a more aesthetically pleasing appearance. It is understood that door system 40 may also be concealed within the door 42, the wall 38 (e.g., above the door frame 44) or the door frame 44, or it may be installed in the floor.

The motor assembly 62 may include a motor 64 (e.g., a reversible electric motor, unidirectional motor, or the like). The motor 64 may include a motor drive shaft 68. The drive train 60 is shown as including a drive gear 70 connected to drive shaft 68, a driven gear 74 connected to output shaft 82 and a chain 72 connecting the drive gear 70 to the driven gear 74. Alternatively, other types of drive trains 60, such as only gears (e.g., no chains), alternatives to chains (e.g., bands, ribbons, or the like), cam and follower, screw mechanism, mechanical linkages, or any type of drive train 60 may be used with a motor assembly 62, or other mechanical, electromechanical, hydraulic, pneumatic, or the like device to open or close the door 42. In some embodiments, operation of the motor 64 rotates the output shaft 82 to drive the linkage assembly 56 to open and/or close the door 42 or to assist in the opening and/or closing of the door 42.

To close the door 42, a closer assembly 54 may be provided for returning the door 42 to the closed position after the door 42 has been opened. The closer assembly 54 may include a closer 80 of standard construction which provides a closing force on the door 42 when the door 42 is in an open position. The closer 80 may comprise a spring system, hydraulic system, pneumatic system, and/or other systems, or combinations of such systems, for providing the closing force. In other embodiments, the closing force may be supplied by the motor 64 that is used to open the door 42 or by a second motor (e.g., a closing motor).

The linkage assembly 56 is shown comprising a first rigid connecting arm link 86 and a second rigid connecting arm link 87. The first connecting arm link 86 is fixed at one end to the lower end of output shaft 82 such that the first connecting arm link 86 is rotated by the output shaft 82. The second end of the first connecting arm link 86 is pivotally connected to a first end of the second connecting arm link 87. The second end of the second connecting arm link 87 is pivotally joined to a door 42 directly or through a mounting bracket 92 fixed to the door 42. While a rigid two-arm linkage assembly 56 is shown, the linkage assembly 56 may be different than that illustrated and may include a greater or fewer number of arm linkages, sliding elements, shock absorbing arms mounting brackets 92, or the like.

While a specific embodiment of a door system 40 is shown, the door system 40 may comprise any suitable mechanisms and may use mechanisms other than, or in addition to, the illustrated components, and thus, is not limited to the embodiment shown in FIGS. 1 and 2 or the specific orientation and/or placement of the illustrated components. For example, the drive system 52 may include hydraulic, pneumatic, electrohydraulic, or electromechanical systems. The drive train 60 may comprise a gear train rather than the chain drive 72. A single reversible motor 64 may be used to provide both the opening and closing forces. Moreover, multiple motors 64 may be used where, for example, one motor opens the door and a second motor closes the door.

The controller 58 is in electrical communication with the drive system 52 (e.g., the motor assembly 62, or the like). The controller 58, which is described in detail below, controls the operation of the motor 64 (and/or other components of the door system 40) and functions to transmit appropriate control signals to the drive system 52 for actuating the motor 64 and the drive train 60. The controller 58 operates to control the drive system 52 in accordance with operating parameters stored in the door system 40 or remotely from the door system 40. By way of example, the controller 58 may control the drive system 52 to maintain the door 42 in an open position for a selected period of time in order to allow sufficient time for a person to pass through the door opening. The controller 58 may also control the speed of the motor 64 for controlling the speed of opening or closing the door 42. Other operating parameters for controlling the operation of the door system 40 will be described in further detail herein later. It is to be understood that although the controller 58 is shown mounted in the casing 48, the controller 58 could also be housed separately from the door system 40 such as within the wall 38, a ceiling, in or on the door itself, in or on the floor, or remotely, such as in a mechanical room for example.

The controller 58 is part of an overall control system which may include an activation device 136 in electrical communication with the controller 58 for allowing a user to selectively control actuation of the motor 64, and thus, the opening and/or closing of the door 42. The activation device 136 is operable to generate and transmit a door movement signal to the controller 58 which, in turn, is responsive to receiving the door movement signal to control operation of the motor 64 so as to control powered opening and/or closing of the door 42. The activation device 136 may be of any known or desired type. For example, the activation device 136 may consist of a manual push pad switch mounted on the wall 38, or a post, adjacent to the door 42. This arrangement is such that a user need only press the push pad to activate the door operator 40 to automatically open the door 42. In other embodiments, the activation device 136 may comprise a pressure pad such as in a switch-type floor mat. Various other activation devices are also suitable for use according to the present invention, including any type of switch, sensor, and/or actuator, including mechanical switching device, infrared motion sensors, radio frequency sensors, photoelectric cells, ultrasonic presence sensor switches, and the like. As a result of the operation of some of these activation devices, an automatically operable door is caused to open by mere proximity of a person to the door. Such proximity may cause the door to operate by virtue of the activation device 136, such as interruption of a light beam (e.g., single bean or curtain), distortion of an electrical field, by the actual physical closing of the switch by contact with the person or in response to the weight of the person approaching the door, or the like. The particular manner for generating a door movement signal to the controller 58 for energizing the motor 64 may be accomplished by any suitable activation device.

One example door operator in which the system of the present disclosure may be used is shown in U.S. Pat. No. 8,499,495, titled "Door Operator," issued on Aug. 6, 2013 to Houser et al., which is incorporated by reference herein in its entirety. Another example door operator in which the system of the present disclosure may be used is shown in U.S. Pat. No. 8,407,937, titled "Door Operator," issued on Apr. 2, 2013 to Houser, which is incorporated by reference herein in its entirety. Another example door operator in which the system of the present disclosure may be used is shown in U.S. Pat. No. 9,514,583, titled "Controller for a Door Operator," issued on Dec. 6, 2016 to Zasowski et al., which is incorporated by reference herein in its entirety. Another example door operator in which the system of the present disclosure may be used is shown in U.S. Patent Application Publication No. US 2014/0325911, titled "Door Operator Assembly," published on Nov. 6, 2014 to Hass, which is incorporated by reference herein in its entirety.

The door systems 40 and the various components described herein may derive power from the power grid. The door systems 40 and the various components described herein may also be battery operated. In some embodiments, the door systems 40 and the various components described herein may use a battery and derive power from the power grid. In some embodiments, the door operator 40 may use a rechargeable battery. A power grid interface derives power from a power line and in turn supplies current to the door systems 40. The power supply feeds power to various components of the door systems 40 including the controller 58, motor 64, charger, battery, sensors 8 and/or the like.

While embodiments of door systems 40 are described and shown herein, the door systems 40 may come in a variety of styles and may utilize a variety of operating parameters. It should be understood that a door operator 40 may both open and close the door, while a door closer may only close the door such that manual opening is used. Door systems 40 may also include manual assist where under certain conditions the door system 40 assists in the manual opening and/or closing of the door. Door systems may be controlled to adjust the opening and closing speeds of the door, they may be adjusted for the size and/or weight of the door, to compensate for wind and/or stack pressure, latch retry, electronic dampening, left/right opening and they may include various sensors to control the safe operation of the door, such as motion detectors.

At least some of the parameters and/or features used to control the door system 40 and/or the components therein (hereinafter "operating parameters") are adjustable such that when a door system 40 is installed at a door 42, the user (e.g., installer, or the like) is required to set the operating parameters as part of the installation process. Some of the operating parameters may be user selected, some of the operating parameters may be manufacturer defined and some of the operating parameters may be set in response to building codes or the like. In existing door systems (e.g., door operators, door closers, or the like), after the door system is installed, the case must be opened and the operating parameters set by push buttons, potentiometers, dip switches and various interactive hardware devices. This requires the installer to manually access the door operator, typically on a ladder, open the case 48 and manually set the operating parameters for each door operator at the controller 58. In commercial settings this operation may require the installer to manually set a large number of door operators individually. Moreover, the user that sets the operating parameters may be different than the user that physically installs the door system such that multiple people must physically access each door system 40. The set up operation may also require the installer to rely on wiring diagrams to determine the appropriate controller input for each operating parameter. Moreover, anytime an operating parameter needs adjusting, a user (e.g., technician, maintenance provider, or the like) must access the door system 40 to adjust the operating parameters, in the same or similar way the installer was required to access the door system 40 (e.g., using a ladder, rely on wiring diagrams, or the like). Moreover, when the user (e.g., installer, technician, or the like) is defining (e.g., setting, adjusting, or the like) the operating parameters of the door system 40, the doors 42 may require blocking off the doorway and/or hallway, thus preventing use of the doorway so that the user can set up a ladder, manually access the hardware to set or adjust the operating parameters. In some embodiments, manual access may be required just to check the current operating parameters of a door system.

Figure 3:
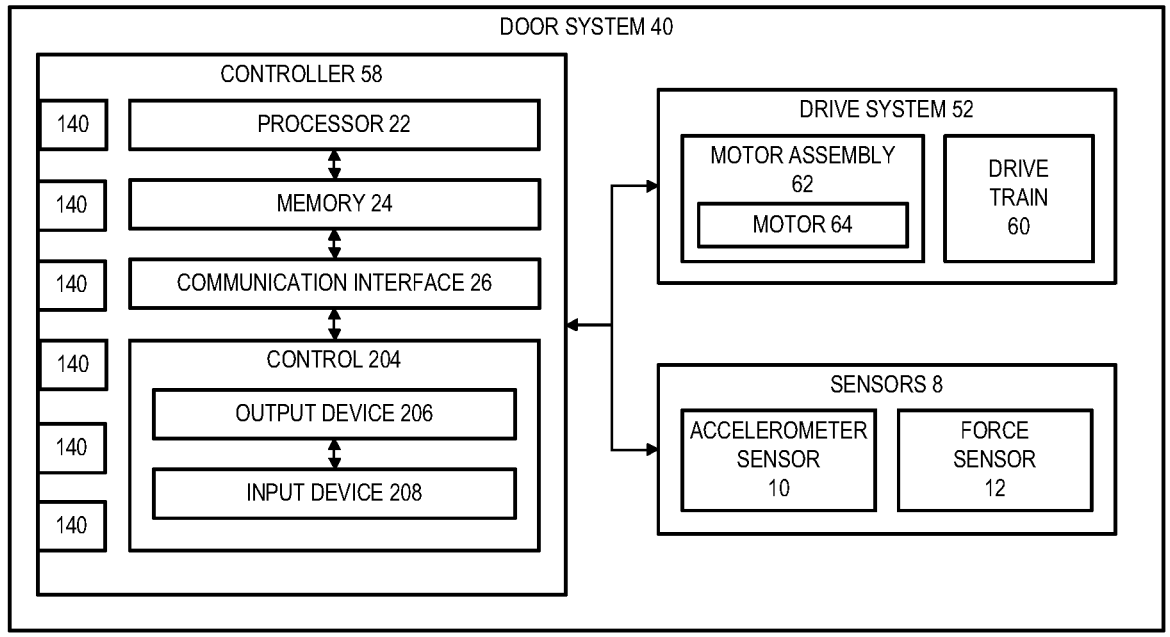
FIG. 3 is a block diagram illustrating the door operator of FIG. 1.

In some of the embodiments of the systems and methods provided herein, information is sent to and received from the door system 40 to allow controlling, monitoring and adjusting of information pertaining to the operation of the door system 40. The systems of the present disclosure may be used by any user (e.g., an installer, technician, or the like), for example, to configure, adjust, command, test, troubleshoot, upgrade and/or monitor a door system 40. Referring to FIG. 3, the controller 58 may comprise one or more processors 22, one or more memories 24, one or more communication interfaces 26, one or more controls 204 (which may be a type of communication interface 26 or separate from the communication interface). The controls 204 (and this, more broadly the communication interface 26) may comprise one or more output devices 206 (e.g., a display, speaker, or the like), and/or one or more input devices 208, all of which may be operatively coupled to each other. The processor 22 (e.g., a microprocessor or a microcontroller) may communicate with the memory 24 for storing and/or accessing instructions and data (e.g., computer readable instructions and/or the operating parameters) in order to operate the door system 40 and provide the functionality described herein. Some of the one or more memories 24 are non-volatile, storing configuration information and program code. As used herein, a "processor" generally refers to a device or combination of devices having circuitry used for implementing the communication and/or logic functions of a particular system. For example, the processor 22 may include one or more digital signal processor devices, microprocessors, and/or microcontrollers and other support circuits and/or combinations of the foregoing. Control and signal processing functions of the system are allocated between these processing devices according to their respective capabilities. The controller 58 may further include functionality to operate one or more software programs based on computer-executable program code, which may be stored in memory 24. As the phrase is used herein, a controller 58 may be "configured to" perform a certain function in a variety of ways, including, for example, by having one or more general-purpose circuits perform the function, by executing particular computer-executable program code embodied in computer-readable medium, and/or by having one or more application-specific circuits perform the function.

The door systems 40 (e.g., door operator, door closer) can include computer program code which, when executed by the processor 22, causes the door systems 40 (e.g., door operator or door closer) to perform as described herein. A computer program product can include a medium with non-transitory computer program code that when executed causes the door system 40 to operate as described herein. The present invention may be embodied as a method, device, article, system, computer program product, or a combination of the foregoing. Any suitable computer usable or computer readable medium may be utilized for a computer program product to implement all or part of the system. The computer usable or computer readable medium may be, for example but not limited to, a tangible electronic, magnetic, optical, electromagnetic, or semiconductor system, apparatus or device. More specific examples of the computer readable medium may include, but is not limited to, the following: a portable computer diskette, a hard disk, a random access memory (RAM), a read-only memory (ROM), an erasable programmable read-only memory (EPROM or Flash memory), a portable compact disc read-only memory (CD-ROM), or an optical storage device.

Computer program code for carrying out operations of the present invention or for assisting in the carrying out of a method according to an example embodiment of the invention may be written in an object oriented, scripted or unscripted programming language such as Java, Perl, python, C++ or the like. However, the computer program code for carrying out operations of the present invention may also be written in conventional procedural programming languages, such as the "C" programming language or similar programming languages. The computer program code may also be written in HTML5 or similar languages that are commonly used for applications or "apps" intended to be run on mobile computing devices such as smart phones, tablets, and the like. While specific examples of programming languages are described herein, these examples are not exhaustive, and the computer program code may be written in any suitable programming language.

Computer program instructions may be provided to the controller 58 to produce a machine, such that the instructions, which execute via the processor 22 of the controller 58, create a device for implementing the functions necessary to carry out the embodiments as described herein. Computer program instructions may also be provided as firmware for an embedded controller or a plurality of embedded controllers.

Referring to FIG. 2, the controller 58 includes, or is in communication with, an on-board communication interface 26, such as a wired communication interface (as will be discussed below) and/or a wireless communication interface (e.g., wireless communication chip) that communicates with a user computer system 30 (e.g., mobile devices, such as remote control, smartphone, or the like) over a wireless connection 32. It should be understood that the wireless communication may occur over any type of wireless network, or such communication may occur directly between the controller 58 and the user computer system 30 such that the controller 58 does not require access to an external network (e.g., external Wi-Fi network, the cellular network or other external network). As used herein, the term "directly communicates" means that the user computer system 30 communicates with the on-board communication interface 26 without an intervening network such as an external wireless network (e.g., external Wi-Fi network, LAN or WAN, or other external wireless protocol). In some embodiments, the controller 58 may be directly coupled to, and may directly communicate with, a user computer system 30 (e.g., a mobile device, such as a remote control, smartphone, or the like) over relatively short distance using the wireless communication interface 26. The controller 58 may be coupled to the user computer system 30 via the wireless communication interface 26 that communicates using a wireless networking protocol, such as WiFi based on the institute of Electrical and Electronics Engineers (IEEE) 802.11 standards, Bluetooth short-wavelength UHF radio waves in the ISM band from 2.4 to 2.485 GHz, a proprietary communication interface or other wireless access technology whether or not described herein.

While in some embodiments, the communication interface 26 communicates directly with the user computer system 30 over a short range via a wireless connection 32 such as WiFi, Bluetooth or other wireless access technology, a wireless connection 33 may operate over long or intermediate ranges and may include intervening networks 35, as shown in FIG. 7. In this regard, the door system 40 may comprise a transceiver 28 that communicates with the controller 58 and that is configured to operate with one or more air interface standards, communication protocols, modulation types, and access types. By way of illustration, the door operator may include a transceiver 28 that may be configured to operate in accordance with any of a number of first, second, third, fourth, fifth, and/or the like generation communication protocols and/or the like. For example, the door system 40 may be configured to operate in accordance with second-generation (2G) wireless communication protocols IS-136 (time division multiple access (TDMA)), GSM (global. system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with 1, TE protocols, with 3GPP protocols, with fifth-generation (5G) wireless communication protocols, and/or the like. The door operator 40 may also be configured to operate in accordance with non-cellular communication mechanisms, such as via a wireless local area network (WLAN) or other communication/data networks.

The wireless communication interface 26 may be on at all times or a user may be required to take an action with respect to an input device 208 to the controller (e.g., action with respect to a physical "key", button, touchscreen, or the like) may be required to enable wireless capability. As such, the user may enter a wireless authentication input into the door system 40. For example, a user may need to turn an on/off switch two, three, four, or other like times in order to enable the wireless communication interface 26 of the door system 40. Other actions may include selecting a pattern of physical input keys or touchscreen inputs, entering the authentication code (e.g., static, dynamic, or the like character code of numbers, letters, and/or symbols, scan a barcode, QR code, or other like code, or the like), holding multiple inputs at the same time, or the like. It should be understood that any action with respect to any input may be required, but that such an action is utilized to provide a layer of security that restricts unauthorized users from accessing the door system 40, in part, by requiring an authorized user to take an action to which only the authorized users are aware.

Additionally, or alternatively, other security measures may be provided to restrict (e.g., prevent, reduce the chance of, or the like) unauthorized access to the door system controller 58 to reduce the chance of tampering with the operating system and/or the operating parameters of the door system 40. Furthermore, to enhance the security of the system and to restrict unauthorized access to the door system 40, the wireless communication interface 26 may have a limited range such that the user computer system 30 must be in within the limited range (e.g., in close proximity) of the door system 40 in order to access the system. In some embodiments, the wireless communication interface 26 may be limited to a range of approximately 100 feet or less, 50 feet or less, 20 feet or less, or approximately 10 feet or less and may have a range of approximately 10 feet. In some embodiments, the range may be even less than 10 feet, although in a preferred embodiment the range is sufficient to allow an authorized user to gain access to the system over wireless connection 32 without the need to climb a ladder. The range may be selected such that the user computer system 30 may program a plurality of door systems 40 at one time. For example, the range may be selected such that the user computer system 30 can access and program a plurality of door systems 40 located along a hallway in a building. Providing the interface 124 with a limited range prevents remote unauthorized access to the system and requires any individual accessing the system to be in relatively close physical proximity to the door systems 40. While specific ranges have been set forth above, it is to be understood that the range of the wireless communication interface device 26 may be increased in certain applications where a greater range is required to access the door systems and/or where unauthorized remote access is not an issue. As such, the wireless communication interface 26 of the door systems 40 may programmable (e.g., set, adjusted, or the like) by an authorized user in order to optimize the range of the wireless communication for the needs of the particular customer.

Moreover, additional security may be implemented such that the user may be required to log into the system and gain access to the controller 58. For example, the system may require that the user's identity be authenticated using a username, a passcode, a cookie, a biometric identifier, a private key, a token, and/or another authentication mechanism. The door system 40 may display an authentication interface on the user computer system 30, which requires the input for user authentication. A suitable authentication response may be provided by the user, such as access code may be provided by the user to the controller 58 via the authentication interface on the user computer system 30 (e.g., remote control, or other mobile device, or the like). The authentication system may use any suitable security measures that may or may not be specifically described herein.

To further enhance security of the system, the door system 40 may be provided with an on/off input 34 (e.g., a toggle switch) located on the exterior of the casing 48, or a remote location, such that the communication interface 26 is operable only when the input 34 is turned on. The input 34 may be located in a position on the casing 48 or off of the casing 48 such that the input is accessible to an authorized user but is not readily available to the general public, such as on top of the casing 48, within a access panel (e.g., cover or the like) on the casing 48, within an access panel off of the casing (e.g., on a wall, post, frame, or the like), or the like.

The controller 58 may communicate with the user computer system 30 (e.g., a mobile device, such as a remote control, smartphone, or the like) over a wireless connection 32, directly or through an external network. The user computer system 30 is used to program the door system 40 to define (e.g., set, adjust, remove, or the like) the operating parameters of the door system 40 after the door system 40 is physically installed on the door/door frame. The user computer system 30 may comprise a mobile device, such as a cellular phone, tablet, dedicated terminal, laptop, remote control, or the like. The wireless connection 32 between the user computer system 30 and the controller 58 may be implemented using dedicated applications (e.g., apps, applet, or the like), portions of dedicated applications, a web browser based interface, and/or the like, or combinations of such systems. The controller 58 may act as a web server providing user interfaces (e.g., web pages, or the like) that may be accessed by the user computer system 30 over the wireless connection 32. The user interfaces can be used for setup, diagnostics, input and output programming, settings, or the like. The controller 58 may collect data for tracking, mapping, sensors, and communication with other devices, notifications (e.g., alerts, messages, or the like) of door activity, performance, maintenance, faulty accessories, installation, or the like.

Figure 4:
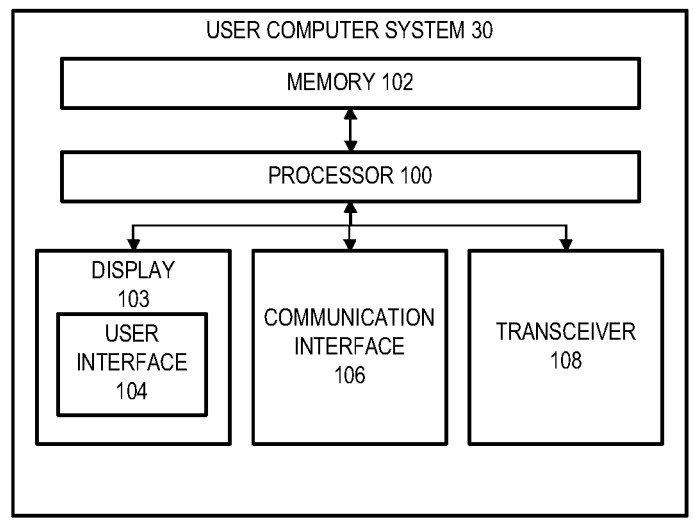
FIG. 4 is a block diagram illustrating a user computer system usable in the setup system of FIG. 1, in accordance with some embodiments of the disclosure.

Referring to FIG. 4, the user computer system 30 may display various menus, icons, and other information to the user on a user interface 104 within a display 103 (e.g., output device) of the user computer system 30. The user can scroll through menus and icons displayed on user interface 104 to transmit information to and receive information from the controller 58. As such, the user computer system 30 comprises one or more processors 100, one or more memories 102 (e.g., having computer readable code and/or data stored thereon, such as like the memories 24 of the controller 58 described herein), one or more displays 103 (e.g., for providing a user interface 104 thereon), one or more communication interfaces 106, and/or one or more transceivers 108, or the like operatively coupled to each other. The one or more communication interfaces 106 may be made up of user output devices and/or user input devices and/or may be separate from such output and input devices. The user output devices may include the display 103 and a speaker or other audio device, which are operatively coupled to the processor 100. The display 103 may be configured to present data in a graphical and/or character format (e.g., alphanumerical, symbolic, or the like format). The user input devices may include any of a number of devices allowing the user computer system 30 to transmit data, such as a keypad, keyboard, touch-screen, touchpad, microphone, mouse, joystick, other pointer device, button, soft key, and/or other input device(s). The user computer system 30 further includes a power source, such as a battery, for powering various circuits and other devices that are used to operate the user computer system 30. Embodiments of the user computer system 30 may also include a clock or other timer configured to determine and, in some cases, communicate actual or relative time to the controller 58.

As used herein, the memory 102, as previously described with respect to the memory 24 of the controller 58, includes any computer readable medium (as defined herein) configured to store data, code, or other information. The memory 102 may include volatile memory, such as volatile Random Access Memory (RAM) including a cache area for the temporary storage of data. The memory 102 may also include non-volatile memory, which can be embedded and/or may be removable. The non-volatile memory 102 can additionally or alternatively include an electrically erasable programmable read-only memory (EEPROM), flash memory or the like.

The memory 102 can store any of a number of applications or code thereof, which comprise computer-executable instructions/code executed by the processor 100 to implement the functions of the user computer system 30 and/or the door system 40, and/or one or more of the process/method steps described herein. For example, the memory 102 may include system specific applications or APPs or such applications as a conventional web browser application. In some embodiments, the user computer system 30 is capable of providing graphical and/or character depictions of the operating parameters of the door system 40. The graphical and/or character representations allow the user to set or adjust the operating parameters of the door system 50.

In some embodiments, the user computer system 30 includes a wireless communication interface 106, such as a wireless communication chip, that communicates with a wireless communication interface 26 over a wireless connection 32, such that the user computer system 30 communicates with controller 58 directly without requiring access to an external network (e.g., Wi-Fi network, the cellular network or other network), or otherwise, through such an external network. As previously described, the controller 58 may be directly coupled to and may directly communicate with the user computer system 30 over wireless connection 32. The communication interface 106 may communicate using a wireless networking protocol such as WiFi based on the Institute of Electrical and Electronics Engineers (IEEE) 802.11 standards, Bluetooth short-wavelength UHF radio waves in the ISM band from 2.4 to 2.485 GHz, a proprietary interface or other wireless access technology that is compatible with the protocol used by the controller 58 whether or not such protocol is described herein.

The user computer system 30 may also be configured to communicate with an external source such as a help desk associated with the door system 40 over a wider communications network. In this regard, the user computer control 30 may be configured to operate with one or more air interface standards, communication protocols, modulation types, and access types. By way of illustration, the communication interface 106 of the user computer system 30 may include a transceiver 108 that may be configured to operate in accordance with any of a number of first, second, third, and/or fourth-generation communication protocols and/or the like. For example, the user computer system 30 may be configured to operate in accordance with second-generation (2G) wireless communication protocols 1S-136 (time division multiple access ('PUMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols, fifth-generation (5G) wireless communication protocols, and/or the like. The user computer system 30 may also be configured to operate in accordance with non-cellular communication mechanisms, such as via a wireless local area network (WLAN) or other communication/data networks. While the communication interface 106, the display 103, and/or the transceiver 108 are shown as separate blocks in FIG. 4, these components may be a single physical component, be within one or more physical components, or the functionality of these components may be shared.

Figure 8:
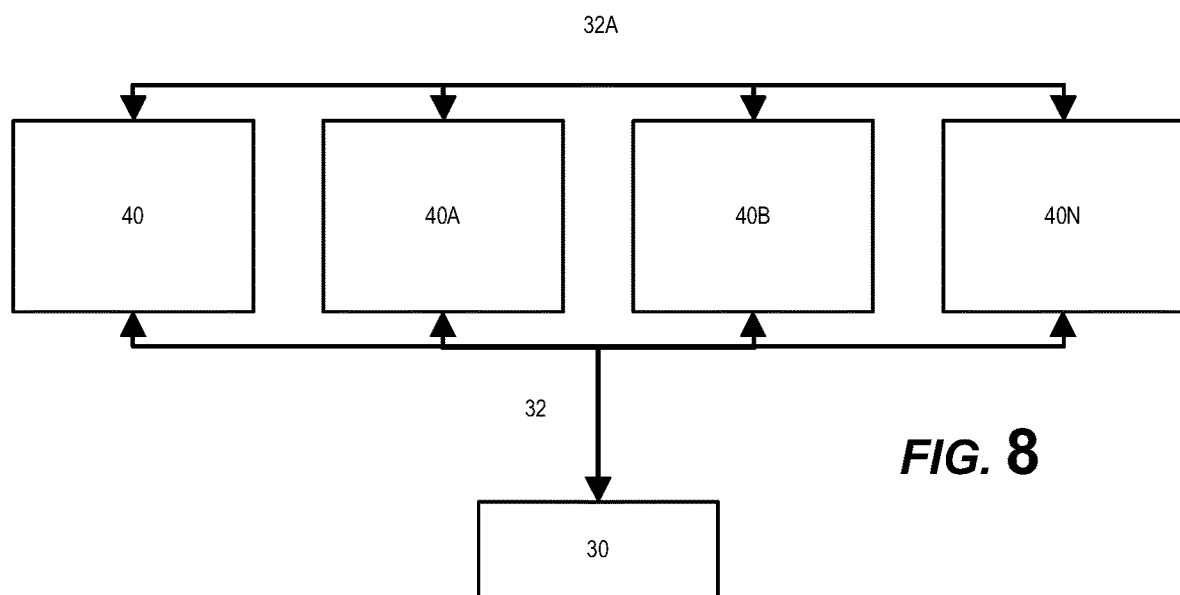
FIGS. 8 and 9 are block diagrams illustrating alternate network architectures of the setup system, in accordance with some embodiments of the disclosure.
Figure 9:
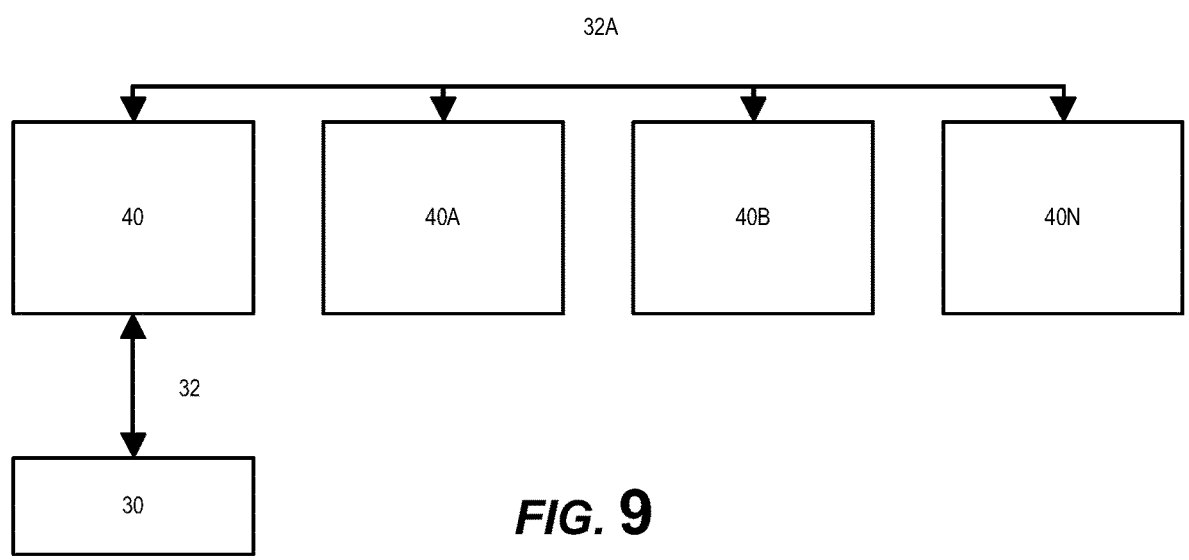

Providing the user computer system 30 with the functionality to communicate over a wider network may not be required for communicating with the controller 58 in order to set up the operating parameters of the door system 30. However, providing such functionality allows the user computer system 30 to communicate with a help desk, retrieve installation instructions from the door system 40 manufacturer over the internet and otherwise send and retrieve information to a node other than the door system 40. Referring to FIGS. 8 and 9, in addition to communicating with the user computer system 30, the communication interface 26 of the door system 40 may communicate directly with other door systems 40 such that operating parameters may be set at one door operator 40, the primary door operator, and those settings may be transmitted via the communication interfaces 26 over additional wireless connections 32*a* . . . 32*n* to other door operators 40*a* . . . 40*n* (e.g., replica door operators). In this manner the user has the capability of installing and setting up multiple door systems 40 by accessing the operating parameters of a single door system from the user computer system 30. The door systems 40 may be arranged in a primary-replica network or in a peer-to-peer network or using other network architectures where the door systems 40 may be individually addressable.

Figure 10:
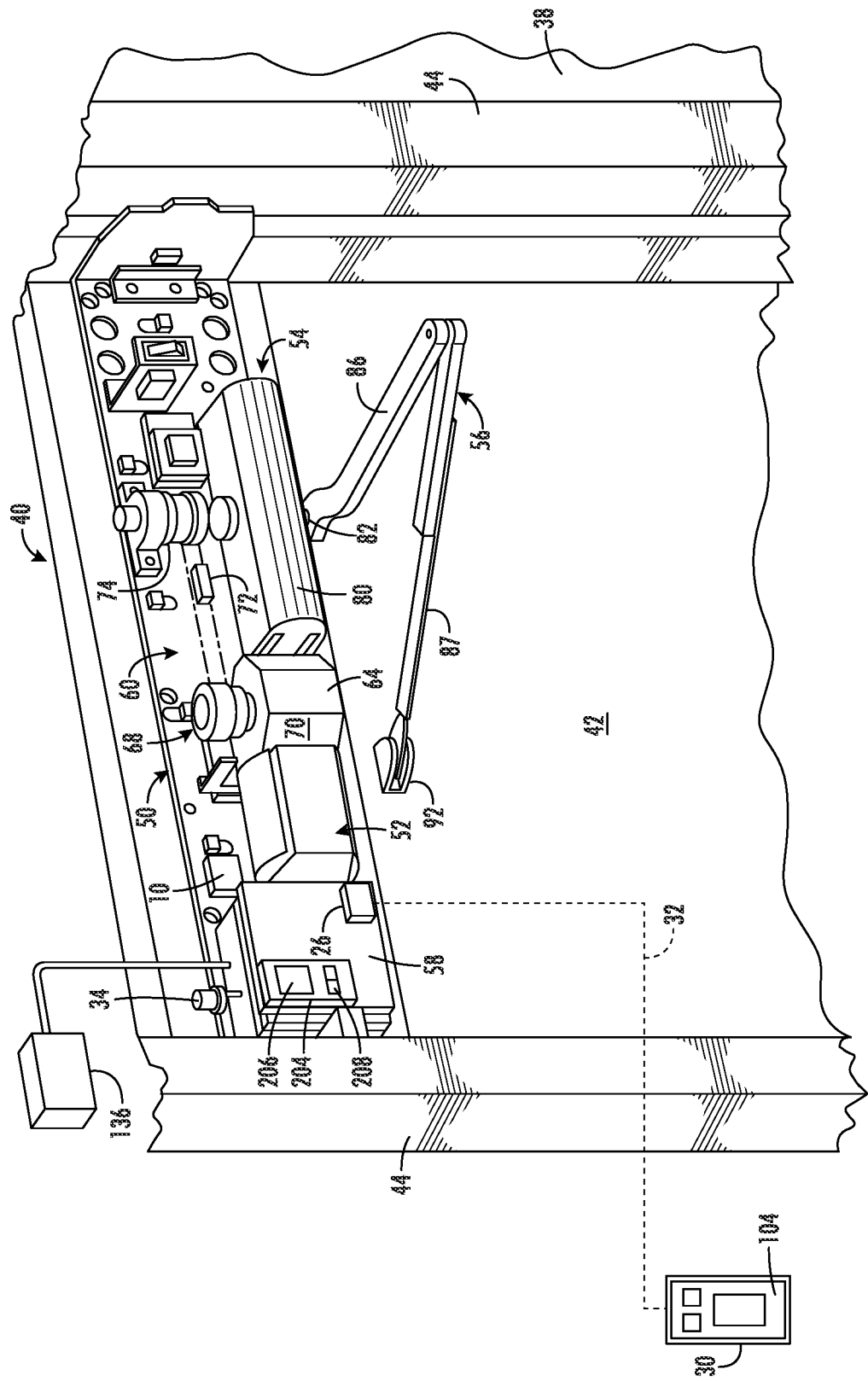
FIG. 10 is a door operator embodying the setup system, in accordance with some embodiments of the disclosure.

In the embodiments described above, a user computer system 30 is used to connect to the door system 40 through one or more user interfaces 104 in a display 103 of the user computer system 30. However, the user may not have a wireless enabled user computer system 30, or access to a user computer system 30. In these situations, it may be desirable to provide components (e.g., devices, interfaces, or the like) that allow a user to communicate with the door system 40 directly (e.g., without the need for the user computer system 30). As shown in FIGS. 1, 3 and 10, the door system 40 may be provided with an onboard control 204 in addition to, in place of, or as a part of the communication interface 26. The onboard control 204 may comprise one or more output devices 206 and/or one or more input devices 208. For example, the output devices 206 may include one or more displays and one or more audio devices (e.g., a speaker/microphone, or the like), which are operatively coupled to the processor 22. The one or more displays may be configured to present data in a graphical, alphanumerical, character, and/or other like format. The one or more displays may include any type of display, such as but not limited to an LCD, plasma, LED, electroluminescent, electronic paper, digital light processing technology, LCoS, field emission, laser TV, Quantum Dot, interferometric modulator, flexible display, vacuum fluorescent, seven segment, Retina, OLED, TFT, AMOLED, and/or any other type of display. It should be understood that the one or more displays may be operatively coupled to the communication interface 26, and/or the other components in the controller 58, such that instead of and/or in addition to, communicating wirelessly with the user computer system 30, the user interfaces 104 (e.g., as described in further detail below) or other like interfaces, may be presented on the display of door system 40. The user input devices 208 may include any of a number of devices allowing the onboard control 204 to receive and transmit data inputted by a user. The input devices 208 may include a keypad, keyboard, touch-screen, touchpad, microphone, mouse, joystick, other pointer device, button, switch, toggle, soft key, and/or other input device(s). It should be understood that in addition to the input devices 208 that may be a part of a control 204 within the controller 58, the controller 58 may include other inputs 140 (e.g., connections to which devices may be connected) as will be described in further detail below.

It should be understood that the control 204, such as the one or more output devices 206 and/or the one or more input devices 208, allows for the functionality of the setup system, as described herein, even if a wireless connection and/or user computer system 40 are not available to the user. As such, the user may utilize the one or more output devices 206 and/or the one or more input devices 208, and the other components of the controller 58 in order to define the operating parameters (e.g., make initial set-up configurations, adjust the present configurations, and/or the like), as will be described herein.

The door system 40 may be provided with default settings for the operating parameters such that absent instructions from the user computer system 30 or through the control 204 the default settings control the operation of the door system 40. The default settings may be changed by the user using the user computer system 30 and/or the door system 40 itself (e.g., through the control 204), such that the door system 40 may be programmed to have customized operating parameters. In some embodiments, the user may change each individual operating parameter and/or may select from a plurality of operating parameter sets, which provide different pre-selected operating parameters based on the type of door system 40, the type of installation, the regulations which the door system 40 should meet. In some embodiments, in order to define the operating parameters, a menu is displayed on a user interface of the user computer system 30 and/or the one or more output devices 206 of the door system 40 that leads the user through a menu of operating parameters that may be programmed by the user to control operation of the door system 40, as will be described in further detail below.

A wide variety of operating parameters may be controlled using the systems of the present disclosure. Example operating parameters are described herein; however, the list is not exhaustive and other operating parameters in addition to, or in place of, those described herein may be controlled. The door system 40 may be controlled to adjust the opening and closing speed of the door. The door system 40 may be controlled to adjust for the size and/or weight of the door. The door system 40 may be controlled to compensate for wind and/or stack pressure caused by the flow of air through a building. The door system 40 may be controlled for latch retry. The door system 40 may be controlled for electronic dampening. The door system 40 may be controlled for left/right opening doors. The door system 40 may be controlled to communicate with various sensors (within the door system and/or operatively coupled to the door system outside of the door system), such as motion detectors, to control the safe operation of the door. The door system 40 may be controlled for whether the door system 40 operates based on an external activation device 136 (e.g., a switch) or operates with a slight movement of the door toward the open position, such as when a user pushes or pulls on the door. The door system 40 may be controlled to operate on both activation of an external activation device 136 and movement of the door. The system 40 may be controlled for obstruction detection, and delay sensitivity may be set and/or adjusted. For example, during the opening cycle, the door may be controlled to press against an obstruction for the obstruction delay time set and then to close normally. During the closing cycle, the door may be controlled to press against an obstruction for the time set and then to attempt to reclose. If the obstruction is still present, power to the motor may be turned off such that only a spring force (or other closing force) pushes the door against the obstruction. The door system 40 may be controlled so that a "latch boost" feature can be adjusted such as to "Off", "Low", or "High." For example, if during the last few inches of door closing, the door does not close due to mechanical door issues, environment issues, and the like, additional closing force can be added to close the door. The additional force may be adjustable. The door system 40 may be controlled to adjust the time the door is held at the fully open position. The door system 40 may be controlled to have a delayed start where the delay to the motor start can be set in increments to allow unlocking of electric hardware. The door system 40 may be controlled for alarm delay. The door system 40 may be controlled to set the closed and open position of the door. While a number of operating parameters have been described above, any operating parameter of the door system 40 may be defined (e.g., set and/or adjusted) using the user computer system 30 over the wireless connection 32, or through the use of the one or more output devices 206 and/or the one or more input devices 208 of the door system 40.

In addition to defining the operating parameters, the door system 40 may communicate with the user computer system 30 and/or other systems (e.g., door system owner systems, maintenance provider systems, or the like) to track and monitor operation of the door system 30. For example, the number of open/close cycles the door system 40 has experienced can be recorded and transmitted to the user computer system 30 and/or other systems. The battery performance can be recorded and transmitted to the user computer system 30 and/or other systems. Other operating performance issues may be tracked, monitored and transmitted to the user computer system 30 and/or other systems.

To monitor the proper installation of the door system 40 and door 42, the door system 40 may include sensors 8 that provide feedback to the user computer system 30 and/or the one or more output devices 206 of the door system 40 (FIG. 3). For example, the door system 40 may receive a signal from a sensor 8 that senses an installation condition of the door system 40. For example, an accelerometer 10 may be provided in the door operator 40 where the accelerometer 10 communicates with the controller 58. The accelerometer 10 performs a level test where the level of the door operator 40 is detected and a corresponding signal is transmitted to the controller 58. The level condition may be communicated (e.g., in a notification) to the user computer system 30 and/or the one or more output devices 206, such that the installer can determine if the door system 40 is installed properly. Similarly, a force detection sensor 12 may be provided that detects the amount of force required to open and/or close the door 42. If the force is above a predetermined level, the system may, for example, determine that the hinges are binding, the linkages of the door operator are not properly installed, or the like. For example, the force detection sensor 12 may be provided in the door system 40 that communicates with the controller 58. The force detection sensor 12 transmits a signal indicative of the force required to open the door to the controller 58. The force level may be communicated to the user computer system 30 and/or to the one or more output devices 206 such that the installer can determine if the door is installed properly. Alternatively, the controller 58 may do a comparison between the actual force as detected by sensor 12 and a desired force and send an error message to the user computer system 30 and/or to the one or more output devices 206 if the actual force as detected by sensor 12 exceeds a desired force limit. Various inputs such as sensors 10, 12 may be connected to the controller 58 at inputs 140 (e.g., connectors to which a device is connected) or may be integral within the door system 40. The inputs 140 may be programmable such that various devices (e.g., sensors, or the like) may be connected to any one of the inputs 140. While the accelerometer sensor 10 and the force sensor 12 are examples of such devices, the devices may include other devices or systems such as security systems/devices, fire protection systems/devices, activation devices 136, motion detectors, vestibule/door interlock systems, HVAC control, door synchronization, locks, exit devices, wall plates, or the like.

Figure 5A:
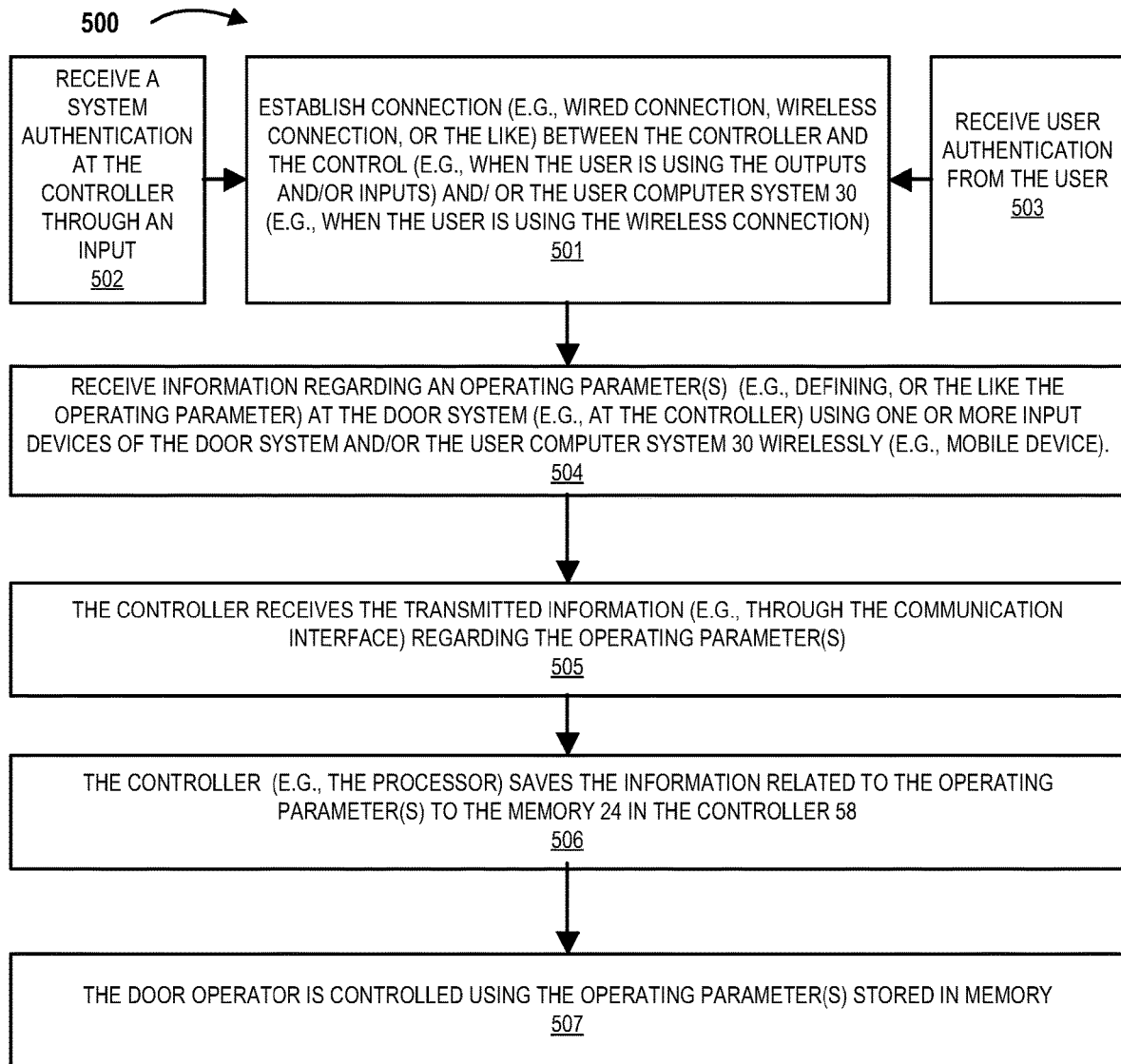
FIG. 5A is a block diagram illustrating a method of using the setup system, in accordance with some embodiments of the disclosure.

A process flow 500 for setting up and operating a door system 40 is described in FIG. 5A with respect to the use of the user computer system 30 and/or the control 204 of the door system 40. It should be understood that a connection (e.g., a wired connection, a wireless connection 32, or the like) between the controller 58 and the control 204 and/or the user computer system 30 is established, as illustrated by Block 501 of FIG. 5A. When the connection is a wireless connection, the wireless connection 32 may or may not be of a limited range and may be a direct connection or intervening network components may be present. In some embodiments, the wireless connection 32 is a direct connection over a limited range. For security purposes, establishing the wireless connection 32 may comprise receiving system authentication at the controller 58 through an input (e.g., inputs 140, one or more input devices 208, and/or other input), as illustrated in block 502 of FIG. 5A. For example, establishing the wireless connection 32 may comprise receiving an action with respect to one or more inputs of the door system 40. For example, the action may require an on/off input to be toggled on and off two, three, four, or the like times in order to activate the communication interface 26 (e.g., a wireless connection interface) and to thereafter allow the user computer system 30 to make a wireless connection 32 to the controller 58. In other examples, other actions may be required in order to create the wireless connection 32, such as selecting a pattern of various keys, making gestures on a touchscreen or for a camera, making a sequence of actions, or the like either through the door system 40, or components thereof, or within the user computer system 30.

To further enhance security, or in the alternative to taking an action as described above, the system may further receive a user authentication at the controller 58 through the control 204 and/or through the user computer system 30 (or through another system that communicates with the controller 58) to authenticate the user, as illustrated in block 503 of FIG. 5A. For example, a user may enter a code, user identifier (e.g., user name, string of characters, or the like) into an input device 208 of the door system 40, and/or into the user computer system 30 when the user is accessing the door system 40 in order to activate a wireless connection 32 or otherwise access the door system 40 after communication has been established.

Information regarding at least one operating parameter may be transmitted to and received by the door system 40, as illustrated by blocks 504 and 505 of FIG. 5A. For example, the information is transmitted by the user using one or more output devices 206 and/or one or more input devices 208 of the door system 40. Alternatively, or additionally, the information related to the one or more operating parameters may be transmitted to the door system 40 through the user computer system 30 to the controller 58 over the wireless connection (e.g., direct or indirect connection). The information that is transferred to and received by the door system 40 may be an operating parameter itself, a value related to the operating parameter, activation of an operating parameter (turning an operating parameter on/off), or the like.

As illustrated in block 506 of FIG. 5A, the information regarding the operating parameter is saved by the controller 58 such as in memory 24 (e.g., using the processor 22 in the controller 58, or the like). As previously discussed herein, the controller 58 controls the operation of the door system 40, such as the operation of the drive system 52 of the door system 50 in the future using the information regarding the one or more operating parameters, as illustrated in block 507 of FIG. 5A.

As previously discussed herein, the user computer system 30 and/or the one or more output devices 206 or input devices 208 may display various menus, icons, and other information to the user on one or more user interfaces. It should be understood that the user interfaces, such as on the door system 40 itself (e.g., on the output device 206 or input device 208 of the control 204, or the like) or on the user computer system 30 (e.g., on the display 103), may be graphical user interfaces (GUIs), or any other type of interface. The user can access (e.g., scroll through, or the like) menus and icons displayed on a user interface to input information to, and receive information from, the controller 58. Referring to FIG. 6A, an example screen shot is shown illustrating a user interface 104 on a display 103 of a user computer system 30. The screen shot of FIG. 6A may be an initial home screen that presents a user with a menu 300 for adjusting or setting the operating parameters of a door system 40 that is in communication with the user computer system 30. The home screen may also present the user with information 302 about the door system 40. The information 302 may include identifying information 304 about the door system 40 such as Serial Number, software Version, hardware Version or the like. The information 302 may also include status information 306 about the status of the door system 40 as installed. For example, the status information 306 may include whether any System Errors are detected. These errors may be based on the sensors or diagnostics performed by the controller 58. The status information 306 may include Cycle Count that indicates use. The status information 306 may include Door Position that indicates, for example, the position of the door system 40. The status information 306 may include other information such as Power Status or Temperature that may be used to determine faulty operating conditions. The information 302 may also include information 308 about the configuration of the door system 40 itself such as Relay or battery conditions.

Figures 6C, 6D, 6E:
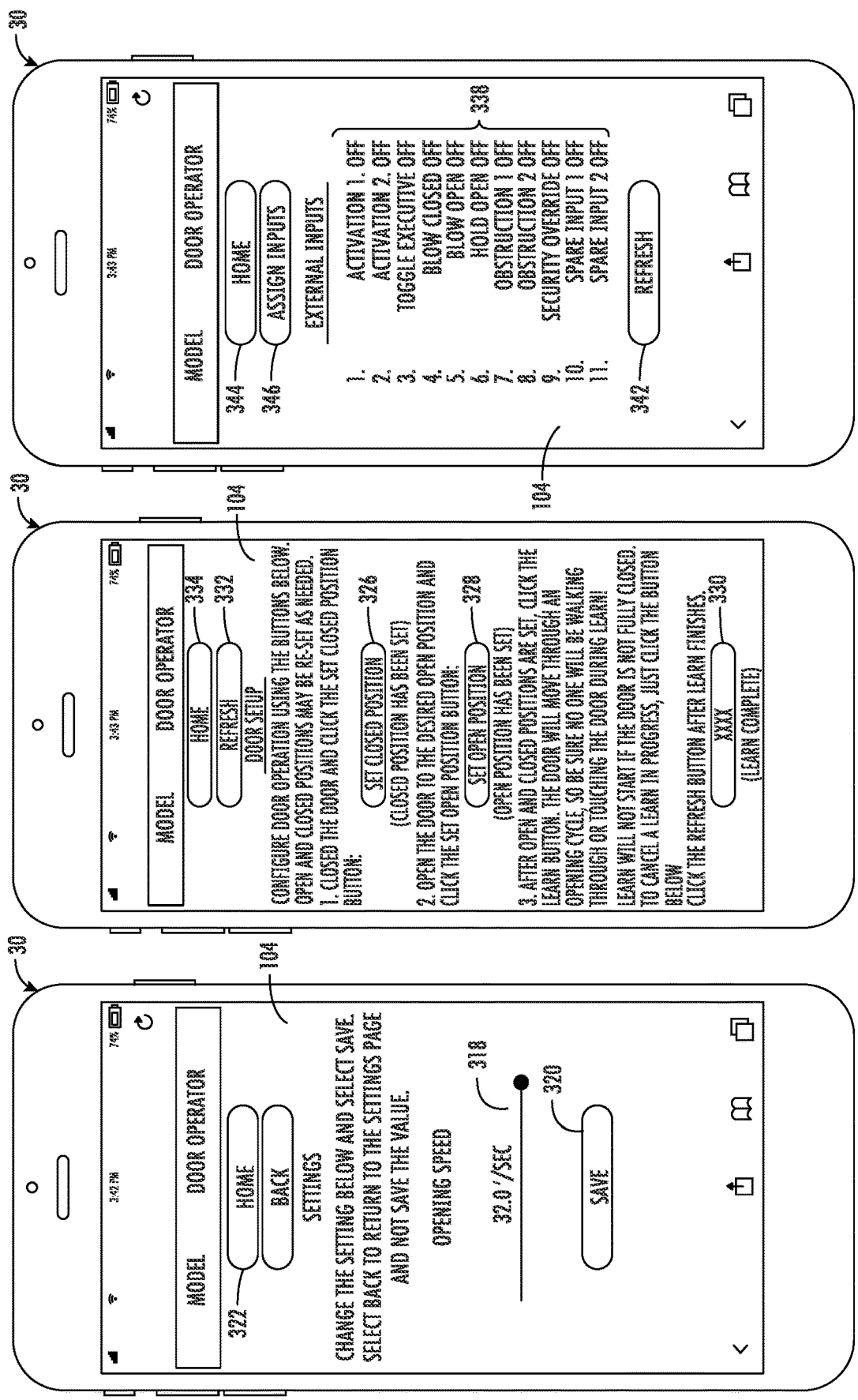

The user may access the control system using the menu 300. For example, assuming that the door system 40 has been installed properly, the user may want to change one or more of the operating parameters. The user may access the "Settings" menu to change the operating parameters by selecting (e.g., on a touchscreen, depressing a virtual or physical icon, or the like) the "Settings" button 310 on the home screen. In the illustrated embodiment, the buttons are soft buttons provided on a touch screen; however, any suitable user input may be used. FIG. 6B shows an example "Settings" menu 312 that may be presented to the user. The "Settings" menu 312 provides a list of user controllable operating parameters. The list of operating parameters is made by way of example and in use the operating parameters may be different than those specifically listed in FIG. 6B. In addition to the buttons 314, the screen may present a value 316 for each operating parameter. The values 316 may be preset values or the values may have been set by the user during initial door setup. The user may select one or more of the operating parameters. For explanatory purposes, assume the user selects "Opening Speed." The user computer system will then display the "Opening Speed" control screen as shown in FIG. 6C. The user may adjust the opening speed using controller 318 and may save the change by pressing the "Save" button 320. In this embodiment, the information provided to the door operator 40 from the user computer system 30 is an identification of the operating parameter to be changed and the value (e.g. speed) of the operating parameter. The settings are stored in memory 24. The controller 318 is shown as an adjustable slider; however, any suitable control may be used. The user may return to the "Home" page by depressing the "Home" button 322.

From the "Home" page, FIG. 6A, the user may press the "Door Set Up" button 324. The Door Set Up button 324 may take the user to a door set up screen as shown in FIG. 6D. The door set up screen may take the user through a series of door set up menus to initialize the operating parameters of the newly installed door system 40. It should be noted that the "Settings" menu (FIG. 6B) may also be accessed during the door set up process to set the initial operating parameters. FIG. 6D illustrates one door set up parameter. As illustrated, the door set up parameter sets the door open position and the door closed position. To use the door set up menu the door is closed and the "Set Closed Position" button 326 is pressed such that the door system 40 is programmed to recognize the position of the door system 40 at the door closed position. Similarly, the door is opened and the "Set Open Position" button 328 is pressed such that the door operator is programmed to recognize the position of the door system 40 at the door open position. These positions are stored in memory 24. The "Learn" button 330 may be pressed such that the system operates the door operator through an open/close cycle. If the door operates properly, the user is instructed to press the "Refresh" button 332 to save the settings in memory of the controller 58. The user may return to the "Home" page by depressing the "Home" button 334.

From the "Home" page, FIG. 6A, the user may press the "Control Inputs" menu button 336. The Control Inputs button 336 may take the user to an External Inputs menu 338 as shown in FIG. 6E. The External Inputs menu allows the user to set the various inputs 140 of the door system 40. For example, the various sensors 10, 12, activation devices 136, or the like as described herein, in addition to other inputs such as from a fire control system, alarm systems or the like, may be connected to the inputs 140 of the door system 40. The External Inputs menu 338 allows the user to designate specific inputs 140 for the various input devices connected to the system using the Assign Inputs button 340. This allows the door operator 140 to be customized for a particular user's needs and integrated into other systems. The user is instructed to press the "Refresh" button 342 to save the settings. The user may return to the "Home" page by depressing the "Home" button 344.

From the "Home" page, FIG. 6A, the user may press the "Support" menu button 350. The Support button 350 may take the user to the manufacturer's web site or other external site such as over an Internet connection where the user may be provided technical support for the installation and setup of the door system 40.

In the embodiments described above with respect to FIGS. 6A-6D, a user computer system 30 is used to connect to the door system 40 through the user interface 104. However, as also described above, the user may not have, or have access to, a wireless enabled user computer system 30. In such situations, it may be desirable to provide the control 204, including the one or more input devices 208 and/or one or more output devices 206 within the door system 40. As such, the one or more output devices 206 may be used to provide the user interfaces (e.g., as described with respect to FIGS. 6A-6D, or other like interfaces) as part of the door system 40. In this manner, the functionality of the setup system as described herein may be provided even if a wireless connection and/or user computer system 30 are not available to the user.

Figure 5B:
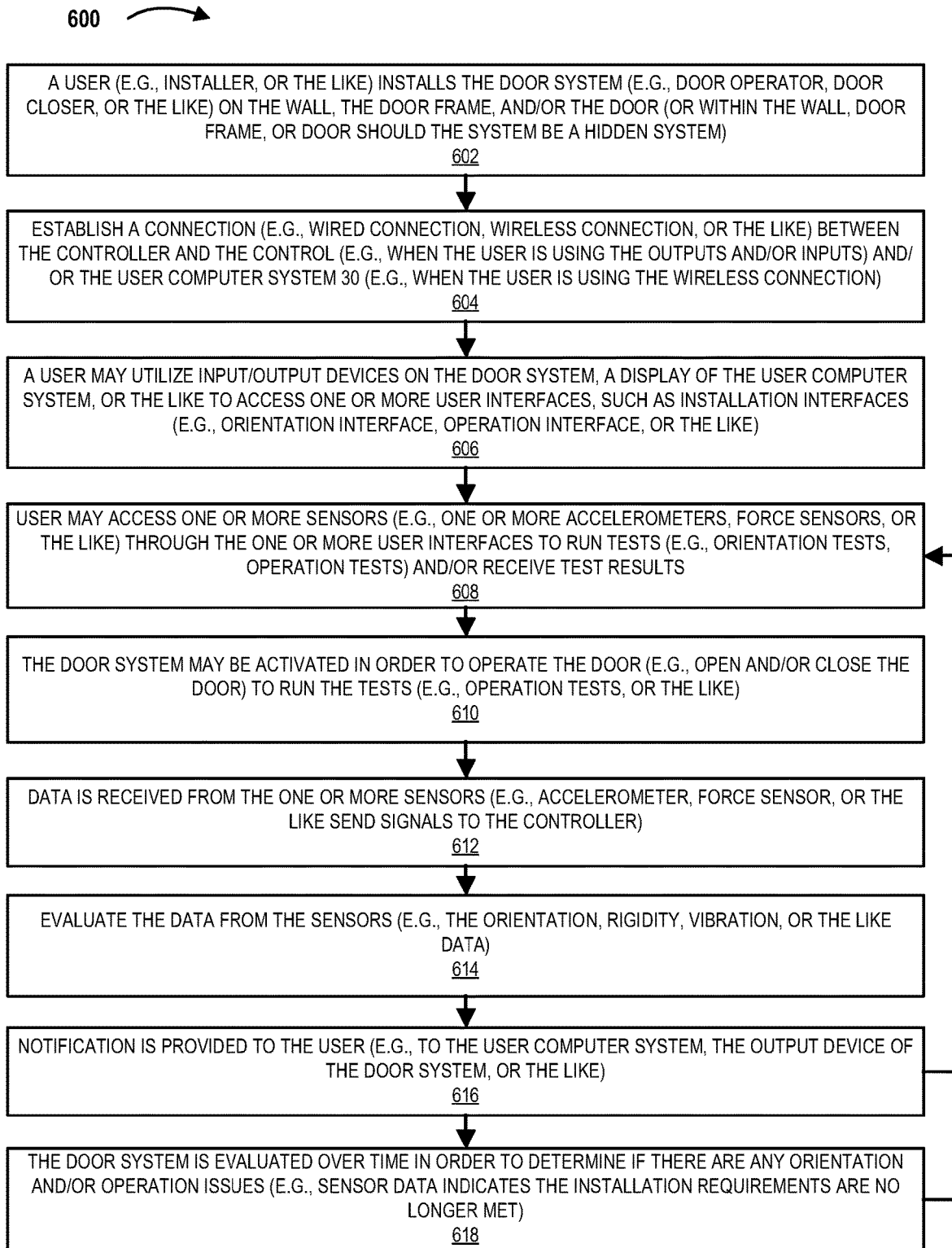
FIG. 5B is a block diagram illustrating a method of using an installation system including one or more sensors, in accordance with some embodiments of the disclosure.

FIG. 5B illustrates a process flow 600 for an installation system (e.g., smart installation system) for the installation of the door system 40 using one or more sensors 8, in accordance with some embodiments of the disclosure. Block 602 of FIG. 5B illustrates that a user (e.g., installer, or the like) first installs the door system (e.g., door operator, door closer, or the like). The user assembles the door system 40 to the wall, frame, door, or the like (or within the wall, frame, door should the door system be a hidden system). The user may connect the door system to power (e.g., wired power, battery power, or the like), any activation devices 136 (push pad, infrared sensors, or the like), or other devices which may be permanent to the installation or removeable after installation (e.g., devices used to install and/or set up the door system). When describing the user as performing functions, it should be understood that the same user may perform the functions or different users may perform different functions because different users may perform different parts of the installation process. For example, a first user may attach the door system 40 to the wall, a second user may connect the door system 40 to the electrical system of the building, and another user may set up the operating parameters and/or test the installation of the door system 40.

In some embodiments, the user may set-up the door system 40 as previously described with respect to FIG. 5A, or as otherwise described herein. The installation of the door system 40 may occur before the setup process 500 described with respect to FIG. 5A and FIGS. 6A-6D above occurs. Alternatively, it should be understood that at least a portion of the setup process described with respect to FIG. 5A and FIGS. 6A-6D may occur before the installation process of FIG. 5B (e.g., some setup may occur before the door system 40 is installed on a door, door frame, or wall). Regardless, as illustrated in block 604, in some embodiments of the installation process 600 a user may establish a connection with the door system (e.g., a wired connection, wireless connection, or the like) between the controller 58 and the control 204 (e.g., when the user is using the output and/or input devices) and/or the user computer system 30 (e.g., when the user is using the wireless connection).

Block 606 of FIG. 5B illustrates that the user may utilize one or more user interfaces 104 on the display 103 of the user computer system 30 or on an output device 206 (e.g., display, or the like) of the control 204 of the door system 40. The one or more user interfaces 104 may include one or more installation interfaces (e.g., an orientation interface, an operation interface, or other like interface), which may be used to check the installation of the door system during and/or after installation of the door system 40. It should be understood that the installation interface may be a single interface that allows for checking the installation of the door system 30 or may include multiple interfaces. It should be further understood that the installation interface may be utilized to verify the proper installation of the door system 40, such that the door system installation meets industry standard requirements, manufacturer requirements, customer requirements, or the like. The installation requirements may relate to the orientation of the door system 40, the operation forces of the door, the vibration of the door system 40, the operation timing of the door, the speed and/or acceleration of opening or closing the door, or other like requirements.

As illustrated in block 608 of FIG. 5B the user may access one or more sensors (e.g., accelerometers, force sensors, or the like), such as through an installation interface in order to determine if the door system was installed on a surface (e.g., the wall, door, door frame, or the like, or within the foregoing) properly to meet one or more orientation requirements. For example, in some embodiments the one or more sensors 8 may comprise one or more accelerometers 10, and the user may access an orientation interface in order to determine the installation orientation of the door system 40. The user may utilize the one or more accelerometers 10 in an installed resting position in order to determine if the door system 40 has been installed level (e.g., horizontal and/or vertical with respect to the ground or door plane, or the like), plum (e.g., with respect to the installed surface, such as the wall, door, door frame, or the like), or other like. As previously described herein, the accelerometer 10 may perform one or more tests automatically (e.g., level tests, plum tests, or the like upon set-up) where the level of the door system 40 is detected and a corresponding signal is transmitted to the controller 58. The level condition (e.g., degrees from horizontal and/or vertical, or with respect to the ground or another feature, such as a surface of the door, door frame, wall, or another component) and/or the plum condition with respect to a surface (e.g., the door, door frame, or wall) may be communicated (e.g., transmitted using a signal) to the user computer system 30 and/or to an output device 206 (e.g., LCD screen, touchscreen, or the like) of the control 204, such that the user can determine if the door system 40 is installed properly in accordance with any installation requirements related to the orientation of the door system 40. Alternatively, a user may request the orientation testing (e.g., level test, plum test, or the like), such as through an orientation interface, and thereafter, receive the level condition, plum condition, or the like as described above after making the request (e.g., through the orientation interface).

Alternatively, and/or additionally, the user may access one or more installation interfaces (e.g., an operation interface) in order access other sensors (e.g., the accelerometers, the force sensors, or the like) to run other tests related to the orientation and/or operation of the door system 40 or other components of the door assembly.

Block 610 illustrates that in some embodiments the door system 40 may be activated (e.g., turned on during set-up) such that the door is operated (e.g., door operator may be activated to open and/or close, or a door closer may be manually opened and allowed to close) in order to perform one or more installation tests (e.g., orientation tests, operating tests, or the like). For example, a rigidity test, vibration test, acceleration test, speed test, force test, or the like may be performed by allowing the door system 40 to open and/or close (e.g., through the use of the motor, springs, or the like). The opening and/or closing of the door may be performed using different operating parameters based on how the door may operate during any number opening and/or closing cycles (e.g., based on different required operating environments), during maximum operation (e.g., maximum speed, acceleration, or the like), during minimum operation (e.g., minimum speed, acceleration, or the like), and/or based on other operating parameters. In some embodiments the operation testing may only occur after the user sets up the operating parameters based on the operating requirements of the door system 40 that the user is installing (e.g., as described with respect to FIG. 5A). During operation of the door system 40 the one or more sensors 8 (e.g., the accelerometer 10, the force sensors 12, or the like) collect data regarding the operation of the door system 40.

Block 612 of FIG. 5B further illustrates that data is received from the one or more sensors 8 after operation of the door (e.g., during installation, or the like). It should be understood that the data may be received by the controller 58 and sent to the one or more output devices 206, to the user computer system 30, and/or to another offsite system (e.g., offsite monitoring system). With respect to an offsite system it may be located apart from the door system 40 and/or user computer system 30 and may receive the data directly from the door system 40 or through the controller 58 and/or the user computer system 30. The data that may be received from the one or more sensors 8 may include the orientation of a component (e.g., a portion of the door system 40) as the door is operated. For example, the accelerometer 10 may move as the door is being operated and may capture data related to the movement of the door system 30 and/or a component thereof. The data captured may include the movement of the sensor in various degrees of freedom (e.g., X, Y, and/or Z planes, a rotation, or the like). The data may include tracking the movement of the accelerometer 10 over time, such as along an arc should the accelerometer 10 be mounted on a portion of the door system 40 and/or door as the door is being operated. In other examples, the accelerometer 10 may capture the vibration of the door system 30 or the components thereof as the door is being operated. In still other embodiments the accelerometer 10 may capture the speed and/or acceleration at which the door opens and/or closes. Other sensors, such as one or more force sensors 12 may capture force information related to the operation of the door assembly.

FIG. 5B further illustrates in block 614 that the sensor data (e.g., related to the orientation, the rigidity, the vibration, the speed, the acceleration, and/or the like) received from the sensors (e.g., accelerometer, force sensor, or the like) of the door system 40 may be evaluated. One or more of the systems and/or applications thereof (e.g., the door system, the user system, a remote system on which at least a portion of an application may reside) may evaluate the data received from the sensors by comparing it against targets (e.g., stored threshold values, calculated values, or the like) in order to determine if the door system 40 or other components of the door assembly are installed properly.

For example, the evaluation of the orientation of the door system 40 may comprise comparing the horizontal and/or vertical location of the accelerometer 10 with a desired orientation as the door opens and/or closes, such as within a percentage, degree, or the like of horizontal, vertical, or the like.

In other examples, the evaluation of the rigidity of the door may include the variation of the movement of the accelerometer 10 in different directions (e.g., oscillation in different directions) as the door is opening and/or closing, which may indicate that the components of the door system 40 may not be installed properly (e.g., may not be tightly assembled, installed in the correct configurations, or the like), and thus, the components of the door system may rattle, or the like. The movement of the accelerometer 10 may be compared against a target movement which may be based on performance testing of a properly installed door system 40.

In still other examples, the evaluation of the vibration of the door system 40 based on an accelerometer 10 may be compared to a target vibration that is based on a motor type, a door type (e.g., weight, or the like), and/or the desired operation of the door (e.g., speed, acceleration, or the like), which may also aid in identifying if one or more components of the door system 40 are installed properly.

In another example, the accelerometer 10 may be used to evaluate the acceleration and/or speed of the door as it opens or closes in comparison to a target acceleration and/or speed based on set operating parameters. The evaluation may aid in determining components of the door assembly (e.g., the door system 40 or components thereof, the door, the door frame, the thresholds, or the like) that may not have been installed properly.

In other examples, the one or more force sensors 12 may be used in order to determine a force required to operate the door, which may be used to determine proper installation of various components of the door assembly. The force sensor 12 may be used instead of the accelerometer 10 and/or along with the accelerometer to determine proper installation of the door assembly.

It should be understood that if the data received from the sensors 8 is outside the target values, the systems and/or associated applications may, for example, determine the cause of such issues, identify mitigation procedures, and/or the like and display the forgoing on a user interface. For example, one or more accelerometers 10 and/or force sensors 12 (or other sensors 8) may be used on the individual components within the door assembly. The evaluation of the sensors 8, alone or in combination with each other, may allow for determination of the cause of the lack rigidity, undesired movement, undesired vibration, acceleration or speed that is too high or too low, increased force required to open and/or close the door, or the like. The cause of the issues may include hinges of the door are binding, the frame may be out of alignment with the door, the door threshold may be out of alignment with the door, the door system 40 or other components thereof may be out of alignment with each other or not installed properly, or the like.

It should be understood that the one or more sensors 8 described herein may be located anywhere within, on, adjacent to, or the like with respect to the door systems 40 and/or the components thereof. Moreover, the one or more sensors 8 may be placed in static location such that they cannot be moved or the one or more sensors 8 may be moveable to different locations during or after installation, as needed during the mounting process or during operation of the door system 40. In some embodiments, the one or more sensors 8 may be mounted on the door instead of the door system 40, either permanently or temporarily.

The data collection and/or evaluation may be performed automatically upon operation of the door system 40, and a corresponding signal may be automatically transmitted to the controller 58. The data collected and the evaluation thereof may be communicated (e.g., in an automatic notification) to the user computer system 30 and/or to the one or more output devices 206 of the control 204 by the controller 58, such that the user (e.g., installer, or the like) can determine if the door system 40 is installed properly. Alternatively, a user may request a specific test using the one or more interfaces, and thereafter, the user receives data and/or an evaluation of the data for the test selected.

It should be understood that the installation of the door system 40 using the sensors 8 (e.g., accelerometer sensors 10, force sensors 12, and/or other sensors) may occur at the same time (e.g., single opening and closing which provides information from multiple types of sensors), or single sensors are reviewed individually (e.g., multiple door cycles are preformed to capture different data from various sensors 8).

Block 616 of FIG. 5B further illustrates that a notification may be provided to a user, such as through information provided on output devices 206 of the door system 40 and/or on a user computer system 30. The notification may be any type of notification, such as a notification within a user interface (e.g., an installation interface), an alert on a display, a pop-up window on the display, a text message, e-mail, or the like notification. The notification may provide details regarding the information of the one or more sensors 8, such as the orientation data of the accelerometer 10, the operating data of the accelerometer 10 and/or force sensor 12, evaluation of the orientation of the door assembly or the components thereof, the evaluation of the operation of the door, and/or any other information related to the one or more sensors 8.

For example, with respect to the evaluation of the accelerometer 10, the notification may include information regarding whether or not the orientation, rigidity, acceleration, speed, and/or the like of the installation of the door system 40 meets orientation requirements (e.g., within a percent degree of horizontal or vertical, plum with a wall, the vibrations in the system are less than target levels, or the like), as well as information regarding how to correct any orientation and/or operation issues. For example, the notification may refer to the installation manual, troubleshooting information for the door system (e.g., alignment issues, installation points to check), testing to check the orientation or vibration issues, or the like. In other examples, with respect to the evaluation of the force sensor 12, the notification may include information regarding the operation of the door system 40 as it relates to potential installation issues. For example, the notification may refer to the installation manual, troubleshooting information for the door system (e.g., linkages not properly installed, drive system 52 issues, hinge issues, door frame issues, threshold issues, or the like), testing to check the force issues (e.g., disengage the motor, linkages, remove the door threshold, or the like and open and/or close the door, or the like), or other like information.

Consequently, depending on the evaluation of the data from the sensors 8, and the notifications related to how to troubleshoot the issues, adjustments to the installation of the door assembly may be made. After the adjustments the process returns to blocks 608-616 to provide additional testing of the door assembly by accessing the one or more sensors 8, activating the door system 40, receiving data, and/or the evaluations of the data, as previously described herein.

FIG. 5B further illustrates in block 618, that the door system 40 may be monitored (e.g., continuously or periodically) in order to determine additional data from the one or more sensors 8 and/or evaluate such data to determine if the door assembly components are not operating as installed (e.g., have been hit and damaged, through wear and tear, have been tampered with, or the like) and/or as required (e.g., under changed operating requirements, or the like). Consequently, a user (e.g., maintenance technician, or the like) may review any sensor data and evaluation thereof when the user is servicing the door assembly, and/or a notification may be sent to the user (e.g., onsite, offset, or the like) when the sensor data (e.g., orientation, operation, or the like) identifies that the door assembly operates outside of any installation requirements.

Figure 5C:
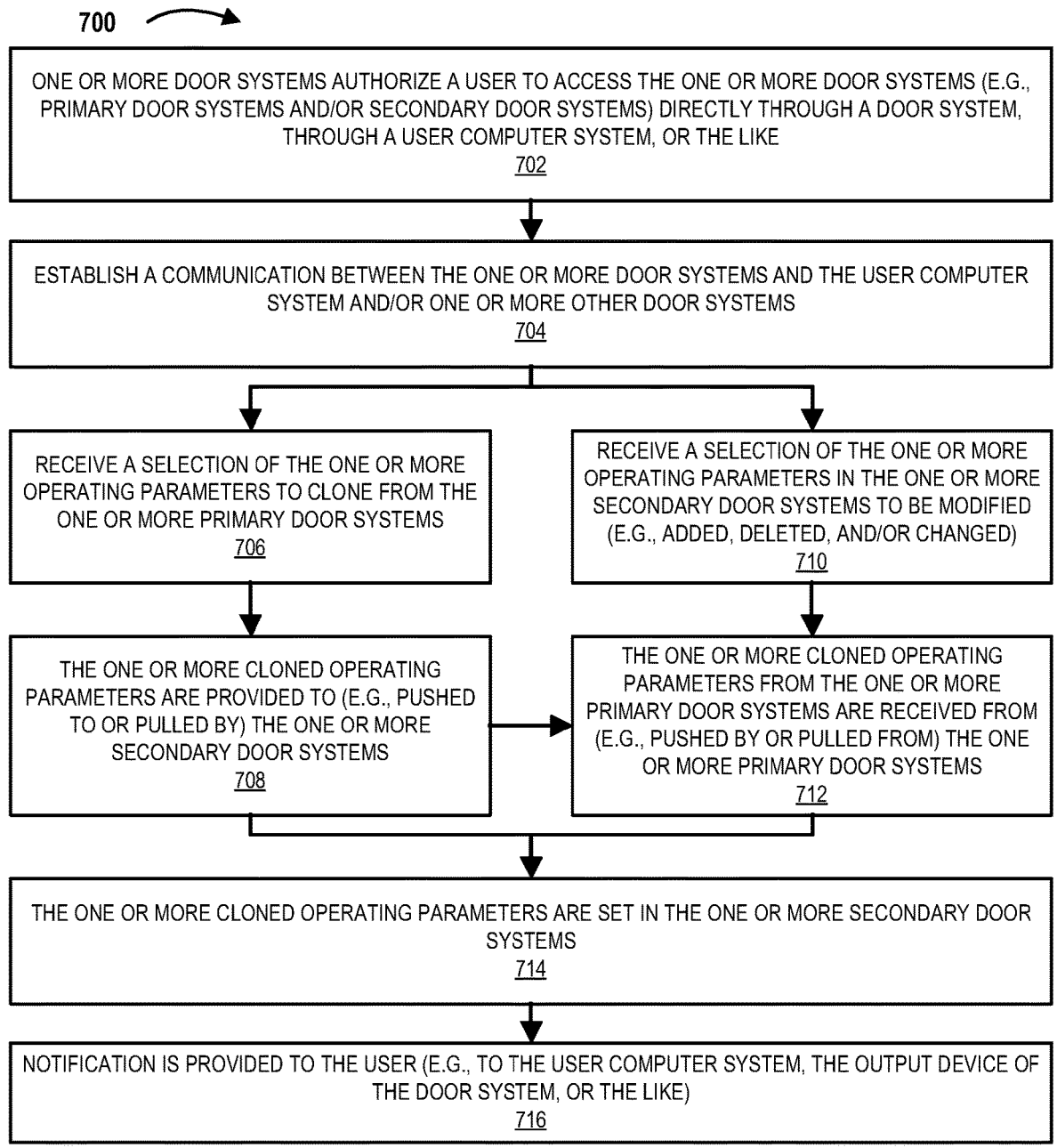
FIG. 5C is a block diagram illustrating a method of using a cloning system, in accordance with some embodiments of the disclosure.

In addition to setting up the installed door system 40, as described with respect to FIG. 5A and FIGS. 6A-6E, the operating parameters of the installed door system 40 may be cloned and provided to other door systems 40. FIG. 5C illustrates a process flow 700 for a cloning system (e.g., smart cloning system) for cloning operating parameters between two or more door systems 40. As will be described in further detail with respect to FIG. 5C, operating parameters from one or more primary door systems 40 (e.g., a single door system 40 or multiple door systems 40) may be accessed and cloned (e.g., copied, or the like) in order to quickly and effectively set up secondary door systems 40 (e.g., a single secondary door system 40 or multiple secondary door systems 40). It should be understood that as used herein with respect to the door systems 40, "primary" and "secondary" means different door systems 40, such that the operating parameters of at least one door system 40 are being cloned for use with at least one other door system 40. As such, any door system 40 may be a primary or secondary door system depending on the door system 40 from which the operating parameters are being cloned and the door system 40 to which the operating parameters are being provided. Moreover, a door system 40 may be both a primary door system 40 and a secondary door system 40 if at least one of its operating parameters are being cloned and at it is receiving at least one cloned operating parameter. As such, instead of a user accessing each door system 40 and programing the operating parameters of each door system individually (e.g., an installer during installation, a service provider adjusting and/or performing maintenance with respect to the door systems, a service provider changing settings to meet governmental requirements, or the like), the user may be able to quickly clone and distribute the operating parameters of one or more door systems 40 to one or more other door systems 40. As will be further described herein, the operating parameters of the door systems 40 may be cloned and provided through the door systems 40 communicating directly with each other, through one or more user computer systems 30 acting as an intermediary (e.g., a mobile device, such as a smart phone, or the like), and/or through a centralized computer system acting as an intermediary, or the like. The cloned operating parameters may be actual operating parameters for a physical door system 40 that is being installed and/or in current operation. However, in some embodiments, the cloned operating parameters may be from a virtual door system that is not a specific physical door system 40, but a representation of a door system 40. As such, an application may store multiple pre-defined door operating configurations (e.g., configurations for physical door systems 40 and/or virtual door systems) which may be provided to (e.g., pushed to, pulled by, or the like) secondary door systems to quickly and easily set up physical door systems 40. Alternatively, the cloned operating parameters may be useful in providing customized door system operating parameters that are not already pre-defined to other door systems 40.

Block 702 of FIG. 5C illustrates that one or more primary door systems 40 authorize access by a user, such as through a user computer system 30 or accessing the door system 40 directly through the use of the control 204 of the door system 40. For example, as previously described in Blocks 501-503 of FIG. 5A, a connection (e.g., a wired connection, a wireless connection 32, or the like) between the controller 58 and the control 204 and/or the user computer system 30 is established. For example, the door system 40 may receive a user authentication at the controller 58 through the control 204 and/or through the user computer system 30 (or through another system that communicates with the controller 58) to authenticate the user. In some embodiments, a user may enter authentication requirements (e.g., login and password, or the like) into an input device 208 of the door system 40 when accessing the door system 40 directly, and/or into the user computer system 30 when the user is accessing the door system 40 through a wireless connection 32 using a user computer system 30 (e.g., a mobile device). Additionally, and/or alternatively, the user may access the door system 40 by connecting the user computer system 30 to the door system 40 through a wired connection (e.g., plugging the user computer system 40 into an input 140, such as through a USB chord, using another device with a USB, or using another connection to an input 140 of the controller 58). In some embodiments of the invention, when accessing the door system 40, the user may be automatically authenticated based on the user having the user computer system 30 within range of the door system 40, as previously described herein.

Block 704 of FIG. 5C illustrates that once the user accessing the primary door system (e.g., directly through the control 204 and/or through a user computer system 30) is authorized, the door system 40 may establish a communication with the user computer system 30 and/or secondary door systems 40. It should be understood that a primary door system 40 may communicate directly with a secondary door system 40 (or vice versa), alternatively, the communication between the door systems 40 may be facilitated by a user computer system 30 (e.g., a mobile device, service, remote computer system, or the like). Alternatively, the communication link may only be made between the door system 40 (e.g., primary door system and/or secondary door system) and the user computer system 30 (e.g., a mobile device, a memory storage—USB memory, or the like, other like device). For example, a USB memory device, or other like device may be inserted into an input 140 in the controller 58 in order communicate with one or more processors 22 and/or memories 24 of the door system 40 in order to clone and/or set operating parameters.

Blocks 706 and 708 illustrate the situation where the door system 40 being accessed is the primary door system 40 having the operating parameters being cloned for distribution to the secondary door system 40. Alternatively, blocks 710 and 712 illustrate the situation in which the door system 40 being accessed is a secondary door system 40 receiving the cloned operating parameters of the primary door system 40.

As illustrated by block 706 in FIG. 5C, the primary door system 40 receives a selection of the one or more operating parameters to clone (e.g., copy, or the like). It should be understood that the selection of the one or more operating parameters may be made directly from the control 204 of the primary door system 40 or from an application on the user computer system 30 (e.g., mobile device, other hardware device). The one or more operating parameters selected for cloning may include all of the operating parameters of the door system 40, or it may be a selection of particular operating parameters, such that only some of the operating parameters may be cloned for distribution to the secondary door systems 40. As such, a user may select specific operating parameters (e.g., speed, acceleration, but not opening duration and spring setting for the opening force, vice versa, or the like) to be cloned. Consequently, only the operating parameters that are going to be distributed to the one or more secondary door systems may be cloned for distribution. For example, should new operating requirements be required for some operating parameters of some door systems 40 (e.g., new operating requirements based on location—internal door, external door; area of use—between rooms with different environmental conditions; door type—door weight, size; or the like) only some of the operating parameters of a primary door system 40 may be cloned. The cloned operating parameters may be stored (e.g., within the primary door system 40 being accessed, within a user computer system 30, and/or both) for distribution to the relevant secondary door systems 40. It should be understood that the cloned operating parameters may be selected from a single primary door system 40 or from two or more primary door systems 40. For example, a user using a user computer system 30 may select one or more operating parameters from a first primary door system 40 and one or more operating parameters from a second primary door system 40 located in a different place in order to create the cloned operating parameters. Moreover, it should be further understood that while the cloned operating parameters may be described as being captured from a physical door system 40, the cloned operating parameters may be cloned from one or more virtual door systems 40.

Block 708 of FIG. 5C illustrates that the one or more cloned operating parameters from the one or more primary door systems 40 are provided to one or more secondary door systems 40 (e.g., pushed out to the secondary door system 40, or pulled by the secondary door system 40). The cloned operating parameters may be provided to a single secondary door system 40 or multiple secondary door systems 40. The one or more secondary door systems 40 to which the cloned operating parameters are provided may be selected by the user or may be automatically determined (e.g., automatically determined based on the same type of door system 40—such as the same model, same type of location of the door system 40—such as all door systems 40 on external doors, or the like). As described herein, in some embodiments the primary door system 40 may communicate directly with the secondary door system 40 in order to provide the cloned operating parameters to the secondary door system 40. Alternatively, the user computer system 30 (e.g., mobile device, or the like) may wirelessly provide the cloned operating parameters to the secondary computer system 40. As further described herein, the user computer system (e.g., a USB memory, a mobile device, or the like) may be directly connected (e.g., plugged into) to an input 140 of the secondary door systems 40 to provide the cloned operating parameters to the secondary door systems 40.

Returning to block 710 of FIG. 5C, instead of accessing the primary door system 40, a secondary door system 40 may be accessed in order to provide the cloned operating parameters to the secondary door system 40. As illustrated in block 710, the secondary door system 40 may receive a selection of the one or more operating parameters to replace with cloned operating parameters. The selection of the one or more operating parameters may be made directly through the controller 204 on the secondary door system 40 or through the use of the user computer system 30 wirelessly connected or connected through an input 140 on the secondary door system 40. The user may select individual operating parameters to be modified, groups of operating parameters to be modified, or may make a general selection to modify one or more operating parameters (e.g., the cloned parameters provided will replace the related operating parameters in the secondary door system 40).

As illustrated in block 712, the secondary door system 40 may receive one or more cloned operating parameters from one or more primary door systems 40 (e.g., cloned operating parameters from physical door systems, virtual door systems, or the like). The one or more secondary door systems 40 may receive the cloned operating parameters directly from the primary door system 40, or from a user computer system 30 (e.g., wirelessly, or through a hardware connection with an input 140 of the secondary door system 40), as previously discussed herein (e.g., pushed by, or pulled from, the primary door system 40 or user computer system 30, or the like).

FIG. 5C further illustrates in block 714 that the one or more secondary door systems that receive the one or more cloned operating parameters set the one or more cloned operating parameters. For example, the stored operating parameters currently in the secondary door systems 40 may be modified, such as new operating parameters are added, current operating parameters are deleted, and/or current operating parameters are changed based on the one or more cloned operating parameters. It should be understood, that in some embodiments, all of the cloned operating parameters provided to and/or received by the secondary door system 40 are set in the secondary door system 40. Alternatively, only the operating parameters selected for modification are modified with the cloned operating parameters, even if cloned operating parameters are received for other stored operating parameters that were not selected for modification. It should be understood that, cloned operating parameters may be stored within the memory 24 of the controller 58, such that the secondary door system 40 will operate in accordance with the stored operating parameters (e.g., cloned operating parameters and/or any remaining operating parameters not modified).

Block 716 of FIG. 5C illustrates that one or more notifications may be provided related to the process of cloning the operating parameters. The notifications may include confirmation that the operating parameters have been cloned from the one or more primary door systems 40, the cloned operating parameters have been provided to the one or more secondary door systems 40, the one or more secondary door systems 40 have been updated with the cloned operating parameters, or other like notifications related to the process. The notifications may be provided to the primary door system 40 from which the operating parameters were cloned; to the secondary door systems 40 to which the cloned operating parameters were provided and/or set; to the one or more user computer systems 30 through which the operating parameters were cloned from the one or more primary door systems 30 and/or provided to the secondary door systems 40; or the like. As such, a notification may appear on one or more output devices 206 of the control 204 of the door systems 40 or on an interface on the user computer system 30. The one or more notifications may be provided to the user computer system 30 that facilitated the cloning of the cloned operating parameters and/or providing of the cloned operating parameters to the secondary door systems 40. Alternatively, the one or more notifications may be provided any other user computer system 30 for reporting purposes (e.g., other installers, supervisors, maintenance representatives, or the like).

The embodiments of the invention disclosed herein provide numerous improvements over current door system (e.g., door operators, door closers, or the like), such as at least reducing installation time, improving installation quality, reducing component degradation, increasing the life of the door systems and components thereof, providing improved notification of installation and operation issues with the door systems, providing remote set-up or modification of operating parameters during installation or in response to changing operating requirement, providing operating update to multiple door systems at the same time, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A door system, wherein the door system is a door operator or a door closer, the door system comprising:
  a drive system;
  a linkage assembly operatively coupled to the drive system and configured to be operatively coupled to a door, or a door frame or a wall; and
  a controller comprising:
    one or more processors;
    one or more memories having computer readable instructions stored thereon; and
    one or more communication interfaces;
  wherein the controller is configured to control the drive system based on one or more operating parameters stored for the door system;
  wherein one or more cloned operating parameters are created by the controller or a user computer system operatively coupled to the controller from the one or more operating parameters; and
  wherein the one or more cloned operating parameters are provided to one or more secondary door systems through the controller or indirectly through the user computer system.

2. The door system of claim 1, wherein the one or more communication interfaces are configured to receive information for the one or more operating parameters in order to operate the door system.

3. The door system of claim 2, wherein the one or more communication interfaces are operatively coupled to the user computer system through a wireless connection with the user computer system over a network, and wherein the one or more communication interfaces receive the information for the one or more operating parameters from the user computer system.

4. The door system of claim 3, further comprising:
one or more inputs devices, wherein the one or more input devices receive an action from a user to activate the one or more communication interfaces before the one or more communication interfaces allow the wireless connection.

5. The door system of claim 3, wherein the one or more communication interfaces receive an action from the user computer system to establish the wireless connection, wherein the wireless connection is established when the user computer system is authenticated based on the action.

6. The door system of claim 2, wherein the controller further comprises:
one or more output devices; and
wherein the one or more output devices provide one or more user interfaces for displaying the information for the one or more operating parameters.

7. The door system of claim 1, further comprising:
one or more sensors, wherein the one or more sensors are configured to aid in installation of the door system, and wherein the one or more communication interfaces provide a notification regarding operation of the door system.

8. The door system of claim 7, wherein the one or more sensors comprise at least one orientation sensor, wherein the controller determines a door system orientation based on the orientation sensor, and wherein the notification relates to the door system orientation.

9. The door system of claim 7, wherein the one or more sensors comprise at least one operation sensor, wherein the controller accelerates the door to an open position or a closed position, wherein the controller determines an acceleration or a speed of the door using the operation sensor, wherein the controller compares the acceleration or the speed of the door to a target acceleration or a target speed, and wherein the notification relates to the comparison of the acceleration or the speed of the door to the target acceleration or the target speed.

10. The door system of claim 7, wherein the one or more sensors comprise at least one operation sensor, wherein the controller operates the door to an open position or a closed position, wherein the controller determines vibration of the door system during operation based on the operation sensor, wherein the controller compares the vibration of the door system to a target vibration, and wherein the notification relates to the comparison of the vibration of the door to the target vibration.

11. The door system of claim 7, wherein the one or more sensors comprise at least one force sensor, wherein the controller operates the door to an open position or a closed position, wherein the controller determines a force to operate the door when the door system is activated based on the force sensor, and wherein the notification relates to the force determined by the force sensor.

12. The door system of claim 1, wherein the controller is operatively coupled to the one or more secondary door systems directly through a wireless connection.

13. The door system of claim 1, wherein the controller is operatively coupled to the one or more secondary door systems indirectly through a wireless connection with the user computer system.

14. The door system of claim 1, wherein the controller is operatively coupled to the one or more secondary door systems indirectly through a hardwired connection with the user computer system.

15. The door system of claim 1, wherein providing the one or more cloned operating parameters comprises storing the one or more cloned operating parameters on the user computer system using a wired connection or a wireless connection for later transfer to the one or more secondary door systems.

16. The door system of claim 1, wherein providing the one or more cloned operating parameters to the one or more secondary door systems comprises pushing the one or more cloned operating parameters to the one or more secondary door systems, or the one or more secondary door systems pulling the one or more cloned operating parameters from the controller.

17. A method for setting-up a plurality of door systems, wherein the door systems comprise door operators or door closers, each comprising a drive system, a linkage assembly operatively coupled to the drive system and configured to be operatively coupled to a door, or a door frame or a wall, and a controller comprising one or more processors, one or more memories having computer readable code stored therein, and one or more communication interfaces, the method comprising:
receiving a selection of one or more operating parameters stored for a door system;
creating one or more cloned operating parameters from the one or more operating parameters, wherein the one or more cloned operating parameters are created by the controller or a user computer system operatively coupled to the controller;
providing the one or more cloned operating parameters to one or more secondary door systems through the controller or indirectly through the user computer system; and
wherein the door system is controlled based on the one or more operating parameters and the one or more secondary door system are controlled based on the one or more cloned operating parameters.

18. A computer program product for operating a door system, wherein the door system comprises a door operator or a door closer, the door system comprising a drive system, a linkage assembly operatively coupled to the drive system and configured to be operatively coupled to a door, or a door frame or a wall, and a controller comprising one or more processors, wherein the controller operates the door system based on the computer program product, the computer program product comprising at least one non-transitory computer-readable medium having computer-readable program code portions embodied therein, the computer-readable program code portions comprising:
an executable portion configured to receive a selection of one or more operating parameters stored for the door system;
an executable portion configured to create one or more cloned operating parameters from the one or more operating parameters, wherein the one or more cloned operating parameters are created by the controller or a user computer system operatively coupled to the controller;
an executable portion configured to provide the one or more cloned operating parameters to one or more secondary door systems through the controller or indirectly through the user computer system.

\* \* \* \* \*